United States Patent
Yoshida et al.

[11] Patent Number: 5,963,696
[45] Date of Patent: Oct. 5, 1999

[54] METHOD OF PRODUCING A SEMICONDUCTOR LASER MODULE

[75] Inventors: Kazunori Yoshida; Hiromi Nakanishi; Naoyuki Yamabayashi, all of Osaka, Japan

[73] Assignee: Sumitomo Electric Industries, Ltd., Osaka, Japan

[21] Appl. No.: 08/933,837

[22] Filed: Sep. 19, 1997

[30] Foreign Application Priority Data

Sep. 20, 1996 [JP] Japan .................................. 8-271583

[51] Int. Cl.⁶ ....................................... G02B 6/36
[52] U.S. Cl. ........................... 385/91; 385/90; 385/147; 359/900
[58] Field of Search ............... 385/88–94, 147; 359/900

[56] References Cited

U.S. PATENT DOCUMENTS

| | | | |
|---|---|---|---|
| 4,679,908 | 7/1987 | Goodwin | 350/320 |
| 5,087,109 | 2/1992 | Ishizuka et al. | 385/34 |
| 5,353,294 | 10/1994 | Shigeno | 372/43 |
| 5,586,208 | 12/1996 | Nishiyama | 385/93 |
| 5,666,450 | 9/1997 | Fujimura et al. | 385/93 |

FOREIGN PATENT DOCUMENTS

| | | |
|---|---|---|
| 690323A2 | 1/1996 | European Pat. Off. |
| 1-292877 | 11/1989 | Japan . |
| 5-56483 | 8/1993 | Japan . |

OTHER PUBLICATIONS

Patent Abstracts of Japan, vol. 011, No. 170 (P–581), Jun. 1987 re JP–62–002217A.

*Primary Examiner*—Hung N. Ngo
*Attorney, Agent, or Firm*—Pillsbury Madison & Sutro LLP

[57] ABSTRACT

The end of an optical fiber is slantingly cut at an angle $\theta$. A beam propagating refracts on the end surface at a slanting angle $\alpha$. A Laser chip should ideally be mounted at a spot deviating by $x_0 = L\tan\alpha$ from the center on the package, where L is the distance between the lens center plane and the laser surface. The fiber should be deviating in the reverse direction of the deviation of the laser. The deviation of the fiber should ideally be a product of $x_0$ and the multiplying ratio of the lens. The orientation of the fiber should be in the direction where the lowest point of the end surface of the fiber is the closest to the lens axis. In practice, the fiber end should be aligned for maximizing the light power by moving the fiber end parallel in xy-plane and by moving axially in z-axis without rotation. The deviation of the laser alleviates the cost and the time of alignment in the laser module.

25 Claims, 14 Drawing Sheets

Pigtail type
Embodiment 1

Off-axis Optics m: image multiplier

Fig. 6
Off-axis optics glimpsed from fiber
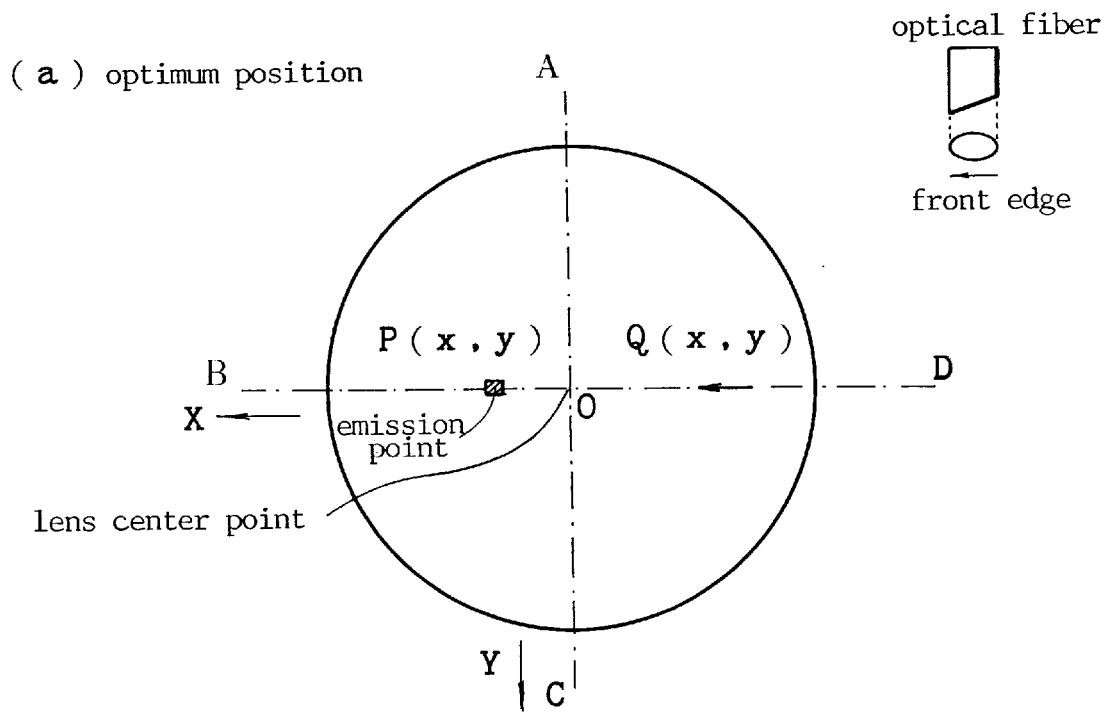
(a) optimum position
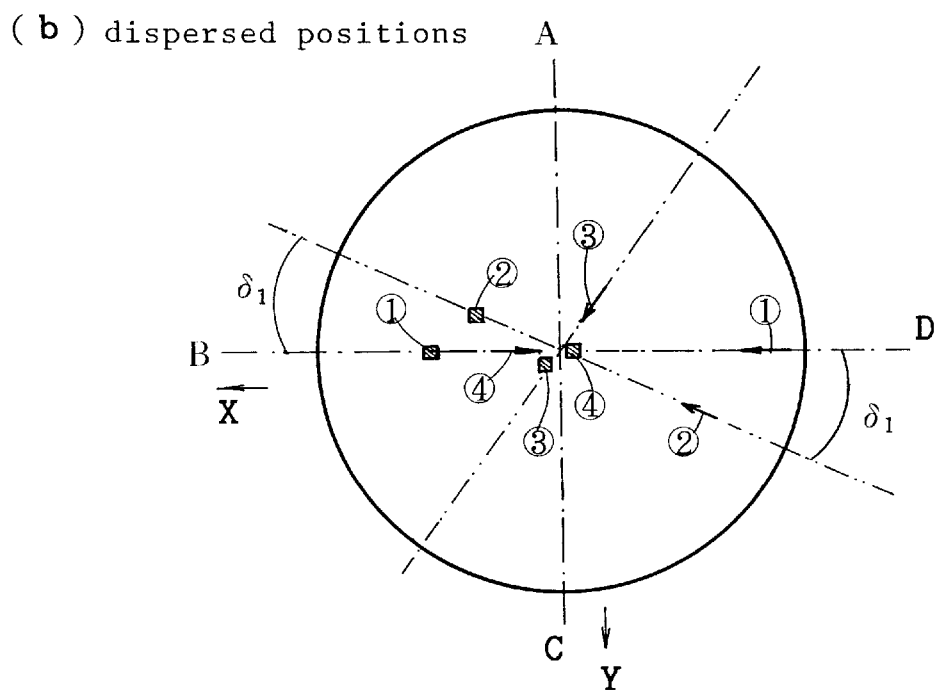
(b) dispersed positions ① 40 μm radius circle of a center (36, 0)

② 40 μm radius circle of a center (55, 0)

③ 40 μm radius circle of a center (72, 0)

④ 29 μm radius circle of a center (36, 0)

⑤ 29 μm radius circle of a center (55, 0)

⑥ 29 μm radius circle of a center (72, 0)

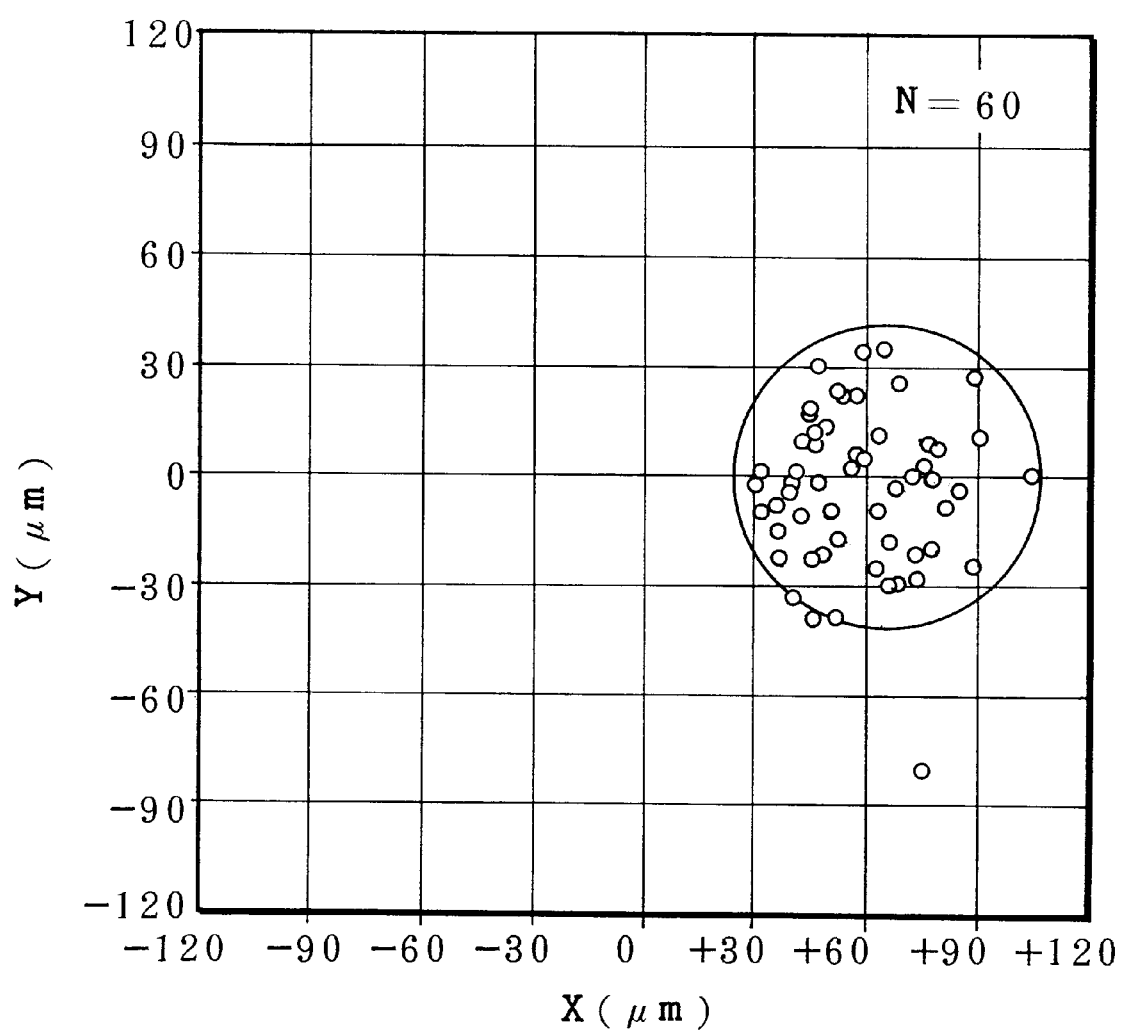

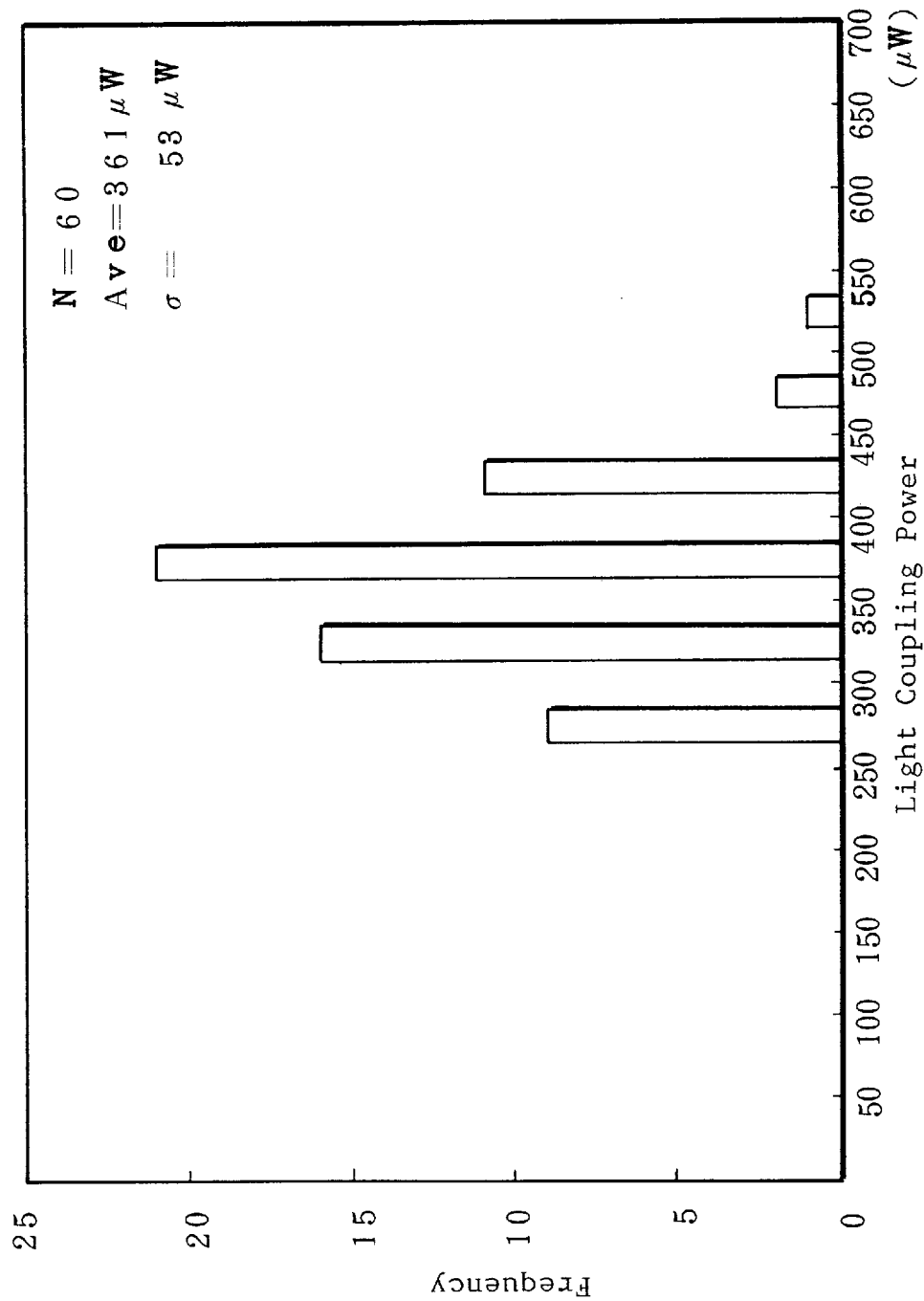

Pigtail type

Embodiment 1

Pigtail type

Embodiment 2

Receptacle type

Embodiment 3

Receptacle type

Embodiment 4

METHOD OF PRODUCING A SEMICONDUCTOR LASER MODULE

This application claims the priority with respect to Japanese Patent Application No.271583/1996 filed on Sep. 20, 1996, which is incorporated herein by reference.

BACKGROUND OF THE INVENTION

1. Field of the Invention

This invention relates to a method of producing a semiconductor laser module for use in the optical fiber communication, and more particularly, relates to a method of producing a semiconductor laser module capable of raising coupling efficiency up and reducing the time for aligning drastically.

2. Description of the Prior Art

FIG. 1 shows a standard structure of an ordinary semiconductor laser module. A package 2 has a semiconductor light emitting device chip 1 and a photodiode 3 for monitoring. There is a pole 6 standing perpendicular to the package 2 near the center of the package 2. The light emitting device chip 1 is fixed to a side surface of the pole 6 via a submount 8. An upper surface of the package 2 is covered with a cap 7 having a window and a lens in the window. In the case of the light emitting device being a laser diode, the monitoring photodiode 3 is fixed to the center part of the package 2 via another submount 9 so as to detect the light launched from the back end of the laser diode chip 1. An end surface 10 of an optical fiber 5 is slantingly polished for preventing reflection light from going back to the laser chip 1. Such returning light would lead to an instable condition of the laser 1. The slanting end 10 is able to prevent noises caused by the instable laser condition.

The light going from the laser 1 outward (forward) is converged by the ball lens 4, and enters a core of the end surface 10 of the optical fiber 5. The light going from the laser 1 to inward (backward) enters the monitoring photodiode 3, and the power of light is constantly supervised. A core axis line of the fiber 5, the center of the lens 4, the center of an emitting part of the laser 1 and the center of the photodiode chip 3 are aligned on the same straight line, that is, are aligned on the same optical axis.

FIG. 2 shows an example of the light emitting device modules practically used. A package 2 shown in FIG. 2 has the same inner structure as that of FIG. 1. FIG. 2 shows a module where parts for fixing an optical fiber 5 are supplied to the semiconductor laser shown by FIG. 1. A cylindrical sleeve 14 is placed on the package 2 and is fixed thereto. A cylindrical ferrule 15 holds an end part of the optical fiber 5. The ferrule 15 is inserted into a cylindrical ferrule holder 16. A bottom surface of the ferrule holder 16 is fixed to a top surface of the sleeve 14. The edge 24 of the ferrule 15 is also slantingly cut together with the fiber. Here, Z-axis is defined as the optical axis direction, and XY plane is defined as the plane perpendicular to Z-axis.

FIG. 2 shows a fixing type (pig-tail type) module in which the end of the optical fiber is fixed, but it is possible to produce another type of module in which an optical fiber can be freely attached or removed. This is, for example, a receptacle type module which is shown by FIG. 3. A dummy fiber 17 is maintained by a ferrule 18 for dummy fiber, and the ferrule 18 is supported by a holder 19. Further, the holder 19 is retained by a cylindrical housing 20. The alignment is carried out among a laser 1, a lens 4, and the dummy fiber 17 as they align on the same axis line.

There are four different alignments for producing a semiconductor laser module, which will be explained.

Alignment 1

First alignment is done for fixing a cap 7 with a lens to a package 2 at the most suitable position. The cap 7 is moved parallel in XY plane, as monitoring the power of light launched from the lens in the direction perpendicular to the lens middle plane. The point which maximizes the perpendicular light from the lens is researched, and the cap is settled on the package at the maximum point. Hence, this alignment is the operation of making the central axis line of the lens accord with the emission point of a laser in XY plane. The positioning of lens requires optical means. The laser should be fixed at the center S of the package as an aim position, but it is actually difficult to dispose the laser exactly at the center S. The position of a lens sometimes deviates from the center S of the package. This alignment is required for bringing the center of the lens to the place just above the laser in conventional modules.

Alignment 2

Second alignment is done for settling a ferrule 15 to a holder 16. The holder 16 and the ferrule 15 are relatively moved axially in z direction on their cylindrical surfaces. This alignment is ordinarily practiced, but is not concerned with the improvements by the present invention. Therefore, the detailed explanation may be omitted hereinafter.

Alignment 3

Third alignment is done for fixing the holder 16 to a sleeve 14. The holder 16 and the sleeve 14 are relatively moved parallel in G surfaces where the bottom surface of the holder 16 is fitted to the upper surface of the sleeve in XY plane. This alignment is the operation for bringing the end 10 of the optical fiber to an image point of the laser by the lens.

Alignment 4

Forth alignment is the rotation of the ferrule 15 around Z-axis on the cylindrical surfaces of the holder 16 and the ferrule 15. This has been hardly necessary for the conventional alignment which aligns a laser, a lens and an optical fiber on the same axis line. This becomes, however, necessary for an alignment of a new module which does not arrange a laser, a lens and an optical fiber on the same axial line. This rotation alignment would be indispensable for the new module having different axes for a laser, a lens and an optical fiber. The rotation alignment is so difficult that it spends a lot of time, which raises the cost of producing modules. The present invention aims at improvements of the forth alignment.

There have been no problems for the prior semiconductor laser modules having the above mentioned structures in their basic performance. According to the enhancement of optical communication applications, low cost and high output power of light (which is the power coupled with an optical fiber, and is briefly written as Pf) have been required for laser modules. A contrivance should be done for satisfying two requirements, that is, high output power and low cost which oppose each other by nature.

For example, Pf=0.1 mW~0.2 mW is sufficient for light power in the case of short-distance transmission of prior optical communication. High output power ranging from 0.5 mW to 1 mW is required for light power in fibers in the case of medium-distance transmission in near future. There is a possibility of contriving individual parts, e.g. lenses, chips, optical systems, and so on in order to enhance the output power Pf.

Adopting an aspherical lens is one method of raising Pf of the modules shown by FIG. 2 and FIG. 3, because an aspherical lens is superior to a spherical lens in aberration and in focusing ability. Such an aspherical lens is, however, too expensive to produce low-priced modules. Two-lens type module where two lenses are used is another method of raising Pf. This method can also enhance both the focusing ability and input power Pf, but can not solve the problem of high production cost yet.

Another method is to produce a semiconductor laser chip endowed with high output power Pf. However, the present invention does not adopt this method, but intends to use conventional semiconductor chips.

A primary factor of decreasing Pf is attributed to an optical fiber end surface that is slantingly cut. Even if light launched from a laser just hits the center of an optical fiber, a large power of light is refracted obliquely by the slanting end of the optical fiber, and is excluded from a core. In other words, the path of light emitted from the core of a single mode fiber is not on an extension of the fiber axis line but has a certain slanting angle to the extension of the fiber axis line. However, the laser lies on the extension of the fiber axis line. Hence, the center of the laser does not exist on the optical path of the light going out of the fiber. Such a geometrical mismatching makes Pf decrease.

Some improvements have been proposed so as to eliminate the geometrical mismatching and increase Pf thereby.

These improvements will be explained as follows.

① Japanese Laid Open Patent Application No.1-292877 (292877/1989)

A lens and a semiconductor laser are installed on an optical path of the light emitted from a slanting cut surface of an optical fiber. Hence, the positions at which the lens and the semiconductor laser are disposed deviate from the extension of the optical fiber axis line. As a result, when the light emitted from the laser strikes and is refracted on the slanting cut surface in compliance with geometric optics, the refracted light proceeds exactly along the optical fiber axis line. Therefore, Pf increases. In this application, however, there is no explanation with respect to the fixing means of the optical fiber, the lens and the semiconductor laser. Further, this application never touched upon the alignments among an optical fiber, a lens and a laser. It is considered that the alignment should be extremely difficult, because the lens and the laser are not on the extension of the optical fiber axis line, but there is no explanation regarding the alignment and the difficulty of alignment.

② Japanese Patent Publication No.5-56483 (56483/1993)

This prior document discloses a laser module having a more asymmetrical structure. A ferrule sustaining an end of an optical fiber is inclined to an axis line of a ferrule holder. A cylindrical part of the ferrule is put into a slanting hole that is bored in the ferrule holder, and is fixed thereto. Hence, the ferrule axis line, in other word, the optical fiber axis line is leaned to a package. When the laser light hits an optical fiber end, is refracted thereon, and goes into the optical fiber, the proceeding direction of light coincides with the optical fiber axis line. Whereby, Pf increases. It is, however, too difficult to make such a slanting ferrule holder, and further this method upheaves the cost of producing the ferrule holder. Furthermore, this laser module has difficulty in handling, because the optical fiber inclines to the holder.

The present invention gives more consideration to the proposal of the prior document ①, throws light on problems, and attempts to give a solution of the problems. What the present invention aims at and solves are explained by referring to FIG. 4 and FIG. 5. The relative positions of a laser G, a lens L and an optical fiber J differ from conventional ones. In FIG. 4, an optical fiber optical axis, a lens optical axis and a semiconductor laser optical axis are in parallel with each other but are not on the same common line. Here, there are discrepancies in three optical axes in XY plane. The semiconductor laser, the lens and the optical fiber are positioned on a slanting line in order. FIG. 4 is drawn by taking the optical axis of the lens, i.e. SHT as a standard. The semiconductor laser is positioned on the left side of the lens, and the axial distance between the semiconductor laser G and the lens L is denoted by "a". "P" is an emission point of the semiconductor laser G. The optical axis PN of the laser G deviates by x from the optical axis SHT of the lens.

There is an end of the optical fiber on the right side of the lens L. The axial distance b between the lens L and the fiber J is b=ma, where m is a magnifying power of the lens. Q is the center of the end of the optical fiber. The center P of the laser, the center H of the lens and the center Q of the optical fiber are on a straight line. The vertical distance x between the optical fiber axis QR and the lens axis ST is denoted by X=mx. There is a vertical gap of x between the laser axis PN and the lens axis ST, and there is a vertical gap of mx between the lens axis ST and the fiber axis QR. The light started from P is converged by the lens L, and forms an image of the laser on the end Q of the optical fiber. A beam of the light going out of the laser leads to the optical fiber J, passing through an optical path of PKQ. Another advancing beam parallel to the optical axis arrives at the center point Q of the optical fiber, tracing another optical path of PMQ. Intersection F of two lines, i.e. MQ and ST is distanced by a focal length f from the lens center H. Furthermore, another beam going out of P passes through the center H of the lens, and reaches Q, tracing a straight optical path of PHQ.

θ denotes a slantingly polished angle of the fiber end surface. In ordinary cases of on-axis incidence of light, an incident angle is equal to θ, but in this case, the light enters the fiber end surface at a slanting angle of α to the axial line. FIG. 5 shows the directions of rays near the end of the optical fiber. An angle of θ is formed between the fiber axis line QR and the normal line n standing up on the fiber end surface. The light from the laser ordinarily enters along the fiber axis UQ. In this case, the laser light goes into the fiber at an incident angle of a to the fiber axis UQ. There exists a condition in order that the laser light MQ is refracted on the fiber end surface Q, and progresses along the axis line of QR. The condition will be shown by the following equation.

$$n_1 \sin(\alpha+\theta) = n_2 \sin\theta \quad (1)$$

Where $n_1$ is the refractive index of air, $n_2$ is the refractive index of the fiber core, α is the slanting beam angle, and θ is the slanting cut angle.

When Eq.(1) is satisfied, the light entering the optical fiber and propagating in the fiber is maximized. Hence, when the following equation is valid, Pf is maximized.

$$\alpha = \sin^{-1}(n_2 \sin\theta/n_1) - \theta \quad (2)$$

The fiber axis QR and the laser axis SN are deviated from the lens axis SHT. It is known that the entering light at an oblique angle of α to the fiber axis is effective in increasing Pf. The prior documents ① and ② disclose nothing about how to stabilize the optical parts with axis deviation without losing industrial utilities nor how to suppress an increase of the production cost, and in particular, how to solve the difficulty of alignments.

In the concrete, since the positions where semiconductor laser chips (LD chips) are mounted are dispersed on packages, an operator should carry out the alignments for seeking the optimum point by moving parallel the fiber end in XY plane vertical to the fiber axis (z-axis) and by rotating the fiber end around the fiber axis (z-axis) at the same time. It may be, of course possible to do such complicate alignments, but it would take a plenty of time to finish the rotation alignment. Therefore, the production of modules would require a plenty of time and a great expenditure of money. Off-axis type semiconductor laser modules shown by FIG. 4 and FIG. 5 have never been produced nor utilized yet due to the difficulties above mentioned.

OBJECTS AND SUMMARY OF THE INVENTION

It is desirable to produce the semiconductor laser modules enjoying high Pf, low production cost and short production time.

It is an object of the present invention to provide a semiconductor laser module capable of increasing input light power Pf and decreasing production cost and production time.

Another object of the present invention is to provide an off-axis type laser.

A further object of the present invention is to provide an off-axis type laser module of facilitating alignments A still further object of the present invention is to provide a method of an off-axis type laser module with easy alignments.

A method of aligning a semiconductor laser module of this invention includes the processes of calculating the most suitable incident direction angle $\alpha$ to a slanting angle $\theta$ of an end surface of an optical fiber, obtaining an objective deviation distance $x_0 = a \tan \alpha$ where a is the axial distance between a lens and a laser, fixing a laser chip at an aim position deviating from the center S of a package by $x_0$ in a certain direction, installing the lens on the package at a position equalizing the center of the lens to the center S of the package in axial direction, maintaining the optical fiber in an orientation where the lowest point of the slanting end surface is coincident with the deviating direction of the laser, moving the optical fiber in XY plane vertical to the fiber axial line, seeking a point capable of obtaining a maximum coupling efficiency, and fixing the optical fiber on the point.

Namely, the laser is installed at a position deviated by $x_0$ from the center of the package instead of positioning the laser chip at the center of the package. It is simple to fix the lens to a cap. The lens is fixed at a position where the center of the lens coincides with the center of the package without measuring the power distribution of light. It is feasible to align the optical fiber by moving it parallel in XY plane, as investigating the power distribution of light of Pf. The coupling efficiency is increased, because the light goes into the fiber at an oblique angle of $\alpha$ suitable for the slanting end surface of the fiber. This invention adopts a complicated arrangement which permits a simple alignment for increasing the coupling efficiency, so that the production cost is not increased.

FIG. 6 shows a plan view projected on XY plane of the optical system shown by FIG. 4. In FIG. 6, position P is the projection of the semiconductor laser and position Q is the projection of the optical fiber on the two-dimensional coordinates taking XY plane in the middle plane of the lens, where the fiber axis direction is z-axis and the center of the lens is the origin. The middle plane of the lens is perpendicular to the optical fiber axis. Since the fiber axis is in parallel with Z axis, the lens middle plane is in parallel with XY plane. The optical fiber in this case represents to an optical fiber of pig tail-type modules or a dummy fiber of receptacle-type modules. There are various cases pertaining to the projected position P (x, y) of the laser on the lens plane and the projection position Q (X, Y) of the center of the fiber on the lens plane, i.e. XY plane.

FIG. 4 shows an example of the most suitable arrangement in which an image of an emitting part of the LD chip is formed on a core of the optical fiber end surface. FIG. 6(a) shows the XY-projection of FIG. 4 on the lens plane. The normal line n standing on the slanting end surface of the optical fiber meets at right angles with Y axis. Hence, the normal line n projected on XY plane is in parallel with X-axis, and further both laser position P (x, y) and fiber position Q (X, Y) lie on X-axis. The ratio of the distances from the origin is "m", and "m" is a constant value. "m" is uniquely determined by the focus f of the lens and the distance "a" between the lens and the semiconductor laser. The deviation x of the laser from z-axis is a parameter. Therefore, P and Q shown in FIG. 6(a) are generally denoted by P (x, 0) and Q (−mx, 0), respectively. The rotation alignment of the angular direction means that the positions of the laser and the optical fiber should be determined as shown in FIG. 6(a). The projected point of the laser is shown by a rectangle, and the projected point of the optical fiber is shown by an arrow.

The alignment of the angular direction requires that the semiconductor laser should be deviated in the direction of the projection of the normal line n of the optical fiber end, and the optical fiber should be deviated by m times in the direction opposite to the projecting direction of the normal line. The rotation alignment of the angular direction is one of three sorts of alignments. Therefore, the alignment among, the laser, the lens and the optical fiber has not been finished yet by the rotation alignment. As shown in FIG. 5, the most suitable slanting angle $\alpha$ of the beam is determined by the slope angle $\theta$ of the fiber end, whereby the most suitable alignment position x of the laser is defined to become $x = a \tan \alpha$. Hence, the most suitable positions are P(a tan $\alpha$, 0) for the laser and Q(−ma tan $\alpha$, 0) for the fiber in FIG. 6(a). The optimum alignment must satisfy three prerequisites.

Prerequisite 1: An image of the LD should be formed on a core of the optical fiber by the lens, that is, OQ=−mOP Prerequisite 2: Both centers of the laser and the optical fiber are in nZ plane including both the normal line n of an end surface of the fiber and Z axis.

Prerequisite 3: The deviation x of the laser from the center satisfies $x = a \tan \alpha$ The position satisfying the above three prerequisites means the most suitable position.

Various factors actually cause dispersion of mounting positions of laser chips on packages. If the relation between the lens and the laser chip is tightly predetermined, every alignment never satisfies all three conditions. Prerequisite 1 may be met by a parallel movement of a fiber in XY plane, but prerequisites 2 and 3 are not always satisfied.

FIG. 6(b) shows an example of the dispersion of laser chips. A positive x point B and a negative x point D are taken on X-axis. A positive y point C and a negative y point A are taken on Y-axis. Here, four examples of ①, ②, ③ and ④ are shown as the mounting positions of lasers in FIG. 6(b).

① is a laser lying at a point on BD line which is a little deviating to B side from the most suitable position of lasers shown in FIG. 6(a). Hence, the laser point ① is shown by P(x, 0), where x>a tan $\alpha$. In this case, the most suitable position of the optical fiber is Q (−mx, 0) deviating from Q(X, Y) of FIG. 6(a) to D side. When the fiber is fixed, it is feasible to determine the most suitable position by moving the end of the optical fiber in XY plane. In this case ①, the image of the LD is formed by the lens on the core of the optical fiber end surface, and the plane including the normal line and the optical rays contains the optical fiber axis, but the incident angle is not the most suitable. Hence, conditions 1 and 2 are satisfied but condition 3 is not satisfied. This case ① has a smaller output power Pf than the optimum case of FIG. 6(a).

② shows that a laser is placed on a straight line inclining at an angle $\delta_1$ to BD axis (X-axis). X-axis is defined to be the projection direction of the normal line n standing on the end of the optical fiber. In this case ②, if a virtual light beam went out of the end of the optical fiber, the beam would pass BD line, but would not attain to the laser ②. If angle $\delta_1$ is small, however, it may be possible to set up the fiber end at the most suitable position shown by arrow ② by moving parallel the fiber in XY plane. Although the image of the LD is projected by the lens on the core of the end of the fiber, case ② gives a smaller output power Pf than the optimum case of FIG. 6(a) because of the inclination of the incident beam to XZ plane including the normal line and the axis line. Hence, the projection position of the laser is denoted by (x, x tan $\delta_1$), and the projection position of the fiber is denoted by (-mx, -mx tan $\delta_1$). Case ② satisfies the prerequisite 1 but does not satisfy the prerequisites 2 and 3. But a sufficient Pf is obtained without the rotation alignment of the optical fiber as long as $\delta_1$ is small.

③ shows the case of having a large deviation angle of $\delta_2$ between the direction of the laser chip and BD line. Here, $\delta_2$ is larger than $\delta_1$. In this case ③, it is still impossible to set up the laser at the most suitable position only by moving parallel the optical fiber to the image position of the LD projected by the lens in XY plane. The optical fiber should be rotated by $\delta_2$ at the image projection position. Whereby, ③ would meet the prerequisites 1 and 2, and would obtain a sufficient Pf.

④ shows the case in which a laser chip is deviated to the opposite side of the optimum spot beyond the origin denoted by O. The laser chip is at a point of x<0 on X-axis. Even if the fiber is moved parallel in XY plane to be OQ=-mOP by two-dimensional alignment, the incident angle of the end of the fiber is still greatly away from an optimum angle. Therefore, the optical fiber should further be turned for 180 degrees. It is not good for an optical fiber to be twisted for 180°. In addition, the alignment system, which is capable of twisting the optical fiber for 180 degrees in XY plane, would become extremely complicated.

Installed positions of the laser chips are actually fluctuated in a certain range around an aim point. When the center of the lens is determined to be an aim point according to conventional LD modules, installed positions of the laser chips are dispersed in all directions with arbitrary distances around the center point O, as shown in FIG. 6(b). Therefore, three alignments, i.e. an XY plane parallel alignment, a Z-axis axial alignment and a rotation alignment around Z-axis, should be practiced in order to bring the fiber end surface into the most optimum position. Particularly, the rotation alignment around Z-axis takes a long time, because the system for rotating the fiber around the center of the fiber is extremely complex.

Immense expenditure of time on alignment results in an increment of the production cost. A method capable of aligning LD modules more precisely in a shorter time has been strongly desired. The Inventors of the present invention have found out a new method of solving the difficulties. When the laser is axially projected on the lens middle plane, as shown in FIG. 6(b), the fiber must be turned for 180°, if the projected image of the laser is in a semicircle of CDA toward the slanting direction of the normal line standing on the fiber end surface. On the contrary, the alignment is much easier when the projected image of the laser exists in the other semicircle of ABC opposite to the normal line slanting direction. If the projected laser image is on BO semiline (X-axis) in ABC semicircle, the optical fiber needs no rotation alignment, which is an advantage.

As mentioned above, the alignment is easy when lasers are mounted within ABC semicircle, but lasers are not necessarily dispersed in the preferred area enclosed by ABC semicircle. It is supposed that lasers should be distributed at random around the aim position P (x, y) (x=a tan α, y=0) of the present invention, as shown in FIG. 7. Then a circle with its center at P is assumed and is briefly called circle P. Circle P cuts across Y-axis AC. Here, it is defined that the part belonging to positive x in ABC is Region M, and the part belonging to negative x in CDA is Region N. When the laser is mounted in Region N, the optical fiber should be rotated for an angle of more than ±90° for rotation alignment. Therefore, the existence of Region N is not preferable. When the laser is mounted in Region M, the optical fiber needs either no rotation or a smaller rotation of less than ±90°.

It is further known from FIG. 8 that the alignment becomes still easier when the installed position of the laser happens to be in a fan-shaped region sandwiched by two lines inclining to X-axis at ±ε starting from the origin. This case requires no rotation alignment. Only the parallel movement in XY plane is enough for the alignment in this case. Such an alignment carried out only by moving the laser parallel in XY plane is the simplest method, and is the most convenient to obtain high industrial efficiency and low production costs.

The basic idea of the present invention has been explained so far. Concrete methods for realizing the idea of the present invention will be explained hitherto.

(1) With respect to the most suitable incident angle α

The most suitable incident angle α for an optical fiber with a slantingly cut end surface is calculated by equations (1) and (2). α is able to be calculated by three factors, i.e. θ, $n_1$ and $n_2$ where $n_1$ is the air refractive index and $n_2$ is the refractive index of a quartz single mode fiber. In this case, $n_1$=1.0, and $n_2$=1.46. a does not depend on the parameters of a lens, but the optimum value of deviation x of a laser from z-axis depends on the focal length f of a lens. Here, α is calculated by adopting a ball lens as an example.

R (radius of the ball lens), $n_3$ (refractive index of the ball lens) and f (focal length) are as follows:

R=0.75 mm, $n_3$=1.502, f=1.122 mm

The most suitable deviation x of the laser from the center axis (Z-axis) of the lens in X-direction, is expressed by the following equation.

x=ftan α

This relation of the above equation is known from the facts that a beam emitted from the LD parallel to Z-axis crosses the axis at a point of the focal length f, and that the beam is refracted by the lens at an angle of α. Although f tan α is the most suitable value for x, the positions of lasers are actually fluctuated. To indicate that x=f tan α is the most suitable value, it is shown by $x_0$ ($x_0$=f tan α).

When θ is assumed to be, e.g. 4° (①), 6° (②), and 8° (③), each α and each optimum deviation value $x_0$ are as follows.

|   | ①     | ②     | ③     |
|---|-------|-------|-------|
| θ | 4.0°  | 6.0°  | 8.0°  |
| α | 1.9°  | 2.8°  | 3.7°  |
| $x_0$ | 36 μm | 55 μm | 72 μm |

Actually, deviation distances x of laser chips installed on a package are not equal to $x_0$ but are dispersed around $x_0$. If x were dispersed from $x_0$, what does it bring about? In this case, even if the optical fiber is placed just at the most suitable position, i.e. at the image of the laser by the lens, only a small power of laser light is able to go into the optical fiber. Because an angle between the normal line of the fiber end and the beam line entering the fiber is deviated from the optimum value of (α+θ). If the beam angle is deviated from (α+θ), how does the power of incident light reduce? The reduction of light depends on a profile of the beams. Gaussian beams are assumed for the power distribution of the later calculations. As the laser is deviated from the most suitable position of $x_0$, the power of light is smaller. The range of allowable dispersion of x is determined by the condition of what degree of degradation of Pf is permitted.

The range of coupling efficiency from the maximum value to a '1 dB fall is adopted as a tolerance of coupling. FIG. 9 is a graph showing the relationship between the laser•fiber coupling efficiencies and the radial distances x between the center of the lens (z-axis) and LDs in the cases of ①(θ=4°), ②(θ=6°), and ③(θ=8°) In the case of ①, the coupling efficiency is a function that takes the maximum value of 0 dB at $x_0$=36 μm (36=1122 tan 1.9°, and decreases when the distance x deviates from 36 μm. Case ② takes the maximum efficiency of 0 dB at $x_0$=55 μm (55=1122 tan 2.8°). Case ③ takes the maximum efficiency at $x_0$=72 μm (72=1122 tan 3.7°). Three curves are able to be overlapped by moving parallel. When a −1 dB fall from the maximum is adopted as a tolerance of coupling, the tolerance of x becomes 82 μm for all three cases.

(a) Degradation of Pf by −1 dB

|         | ①       | ②        | ③         |
|---------|---------|----------|-----------|
| θ       | 4.0°    | 6.0°     | 8.0       |
| x (μm)  | −5 ~ +77 | +14 ~ +96 | +32 ~ +114 |

These calculations are based upon an assumption that the deviation of the laser chip is 0 in Y-direction. Actually, however, the deviation of the laser in Y-direction is not 0. The power of light entering the optical fiber is also decreased by the deviation in Y-direction. Y-direction deviation should be considered besides the X-direction deviation. In case ①, the degradation of coupling efficiency is within −1 dB when the lasers happen to be in a circle with a diameter of 41 μm having a center at a point (36 μm, 0), which, however, includes the region of x<0 that is difficult to arrange. In the case of ②, it is feasible to keep the coupling loss within −1 dB drop by the most suitable alignment of the optical fiber when the laser is mounted in a circle with a diameter of 41 μm having a center at a point (55 μm, 0). In case ③, the coupling efficiency within a −1 dB drop is maintained for lasers in a circle with a diameter of 41 μm having a center at a point (72 μm, 0).

The positions allowable for laser chips are shown by FIG. 10 so as to facilitate intuitive understanding. In the cases of ①, ② and ③, when a laser is mounted in each shaded circle, the coupling loss can be depressed within a −1 dB drop by aligning the optical fiber at the most suitable position. What degree of degradation should be permitted in the coupling efficiency depends on the requested level of system. More rigorous requirement is sometimes imposed on the coupling efficiency, for example, a coupling efficiency range from the maximum value to a −0.5 dB fall. More rigorous cases are explained as cases ④, ⑤ and ⑥. The required efficiency range is −0.5 dB fall from the maximum for ④, ⑤, and ⑥. The slanting end angles of cases ④, ⑤ and ⑥ are 4.0°, 6.0°, and 8.0°, respectively. Namely, cases ④, ⑤ and ⑥ the same slanting angles as ①, ② and ③, respectively. FIG. 9 gives a narrower tolerance of 29 μm radius for a −0.5 dB drop.

|        | ④        | ⑤         | ⑥          |
|--------|----------|-----------|------------|
| θ      | 4.0°     | 6.0°      | 8.0°       |
| x (μm) | +7 ~ +65 | +26 ~ +84 | +44 ~ +102 |

Here, the listed parameters prescribe segments of allowable ranges on X-axis, but the dispersion in Y-direction actually exists. When the laser is fixed in each shaded circle having each shown x-segment as a diameter, the range of coupling loss is able to be depressed within −0.5 dB. ④ shows that a circle has a diameter of 29 μm, and a center (36 μm, 0). ④ further shows if the laser is mounted in this shaded circle, the coupling efficiency can be reduced within −0.5 dB. Case ④ has no difficult arrangement region, i.e. x<0, which appears in case ①, because the diameter of circle ④ is smaller than that of circle ① in spite of the same center coordinate. ⑤ shows a circle having a center (55 μm, 0) with a 29 μm diameter. Circle ⑤ is smaller than circle ② in diameter, which is only a different matter. ⑥ shows a circle having a 29 μm diameter and a center (72 μm, 0). When the laser is fitted in circle ⑥, the degradation of coupling efficiency is able to be depressed within −0.5 dB in case of an 8° cutting angle of the optical fiber.

The size of the circles determining the regions allowable for lasers to be positioned depends on the magnifying power of the lens. This is a matter of course. If the magnifying power is small, the displacement of the laser image at the fiber end surface, which is induced by a deviation of laser position, is small. Therefore, the tolerance circle becomes large, because it shows the range of laser positions permitting a predetermined decrease of coupling efficiency. On the contrary, if the magnifying power is large, the laser image is magnified, so that the fall of coupling efficiency caused by the fluctuation of laser positions becomes large. Hence, the circle showing the allowable dispersion of laser positions becomes small. If the magnifying power is smaller, an allowable dispersion range of laser positions becomes wider, but has a limit. If the magnifying power is small, light coupling power is also small in proportion. The magnifying power is desired to be in the range from 1 to 3 from the viewpoint of each mounting accuracy of the parts of a laser module.

It is impossible to fall back on the method of raising the tolerance of laser positions by lowering the magnifying power.

In the conventional mounting of laser modules, an optical standard for alignment is an LD chip. Hence, an LD chip is fixed on a header first. Then a cap having a lens is moved parallel in XY plane, light power from a lens is being measured above the lens, and the cap is fixed at the position where the maximum power of light is able to be obtained. This prior mounting method allowed the relative positions between lenses and lasers to disperse around the origin O. The prior alignment assumed that the most suitable positions of lenses and lasers should be x=0 and y=0, so that the most suitable relation is that the center of the lens is coincident with the center of the laser, and lasers and lenses are dispersed around the center (0, 0).

The prior alignment never induces such a distribution of lasers inclining toward B side, as shown in FIG. 10. The conventional mounting method has two faults—one is that the concentricity of the lens•laser is not suitable for the optical fiber with a slanting end surface, and second is that the alignment of the lens has to be practiced as continuing to observe the light power emitted from the laser.

This invention proposes a method capable of solving the above drawbacks. This method is available for every optical fiber with a slanting end surface cut at various angles, but in this paper, operations of this invention will be explained for citing an optical fiber with an end surface cut at 6 degrees as an example.

When the parameters of the lens are determined as the above mentioned values, i.e. R=0.75 mm, $n_3$=1.502 and f=1.122 mm, the maximum coupling efficiency shall be obtained by placing the laser at $x_0$=55 μm in case of the optical fiber with a 6 degree slanting end surface. The reason has been explained hitherto. This invention mounts a laser on a package, aiming at a position deviated by 55 μm from the center S of the package in a certain direction. Here, the deviation direction is defined to be X-direction.

There is a clear difference between the conventional method and this method in determining a laser position, because the conventional method aims at the center S of a package, but this invention aims at another position for a laser deviating from S by 55 μm in X-direction. The most suitable deviation distance $x_0$ is not fixed, but is varied by three factors, i.e. a slanting angle θ of a fiber, a focal distance f of a lens, and a magnifying power m of a lens. Although the laser should preferably be fixed at a position deviated from S by 55 μm in X-direction, there inevitably exists an error of mounting. It is very hard to fix the laser precisely at (55 μm, 0). Actual positions of lasers are liable to deviate from a point (55 tL m, 0), and to disperse at random in vertical and horizontal directions.

Since lasers are firstly planned to dispose at a position deviating from S by a certain distance, e.g. 55 μm, in X-direction, the probability of mounting lasers in the shaded regions surrounded by each circle would be extremely higher in the cases of ② and ⑤ than the conventional alignment which aims at (0, 0) for lasers.

If it were unknown which direction is X-direction and where the 55 μm point lies on the package, it would be inconvenient for the mounting operation of lasers. Fortunately, a package, however, does not allow to fix a laser everywhere on a package surface (XY plane), which is a favorable matter. The fixation of a laser on a package does not have a full two-dimensional degree of freedom. Actually, the laser is fixed on a side surface of a pole protruded in the vicinity of the center of a package. Since the laser has a luminous end surface, the striped surface of the laser should be in parallel with the optical axis.

A protrusion part is made on a package, and the laser is fixed to a side surface of the protrusion part. An LD surface and the optical axis are in parallel with each other, so that there are two kinds of degree of freedom. One of degree of freedom is the Z-direction movement, but there are only one degree of freedom from the viewpoint of XY plane. If the side surface of the pole is defined to be YZ plane, the aim point is a position deviating by $x_0$ in X-direction from the center of the side surface of the pole. Hence, it is easy to mount a laser on the package by taking aim at the point deviating from the center by $x_0$. It is surely possible to give some anisotropy to the shapes of a package and a submount. Since such a case requires a special package, production costs might be upheaved.

There may be several methods of fixing an LD chip on a position deviating in x-direction from the center S, but four methods will be proposed here.

(1) The simplest method is that a side surface of a pole positioned at the center of a package is assumed to be YZ plane, and an LD is fixed at a position deviated by $x_0$ toward right or left from the center on the pole side surface.

(2) Another method is that a position of a pole for fixing a laser is firstly formed at a point with an $x_0$ deviation parallel to a pole side surface. The pole is not placed on the center of a package but is placed at a position deviating from the center by $x_0$.

(3) Another method is that a pole is formed at a position deviated by $x_0$ in direction perpendicular to a pole side surface.

(4) The other method is that a thickness of a submount is increased by $x_0$, and an LD chip is fixed via the submount at a side surface of a pole.

An abstract expression such as "aiming at a position deviating from the origin S by $x_0$" would bring about a great expenditures of time and money and an increase of errors. According to the above methods, however, the laser is fixed to the pole, so that mounting with $x_0$ deviation becomes easy. (1) is the simplest method, because conventional packages are available as they are. The methods of (2) and (3) require to produce their special packages. (4) needs an exclusive submount.

The above-mentioned explanation relates only to how to install a laser on a package. But this invention actually aims at the alignment of optical fibers. This invention objects how to fix a laser on a package in order to realize an easy alignment of an optical fiber. In this invention, as explained above, a laser is firstly installed in a package at a position deviating from the center in X-direction. X-direction that is the deviation direction of an LD chip is defined on a package. X-direction is the direction opposite to the projection of a normal line of a slanting end surface of an optical fiber on a package (see FIG. 4 and FIG. 5).

The direction toward the longest point from the center of an oblique optical fiber end surface should be X-direction (see FIG. 6 and FIG. 7). Since the slanting direction of the optical fiber end surface has been shown by marking on a ferrule and so on, it is possible to determine X-direction on the fiber by the mark. X-direction of the optical fiber can coincide with X-direction of the package in mounting the fiber on the package. The alignment of XY plane and the alignment in Z-direction should be done further. Hence, when an optical fiber is aligned to the laser, the rotation alignment of the optical fiber is unnecessary, because the deviation direction has been determined at the beginning by the oblique end of the fiber. Most excellent characteristic of this invention is that such a rotation alignment is unnecessary or nearly unnecessary.

The laser module of the present invention is superior in laser•fiber coupling efficiency to the conventional laser module aligning a laser axis, a lens axis and an optical fiber axis on the same axial line, because the present invention allows all the light emitted from a laser to go into a slantingly polished end surface of an optical fiber at an angle of α which makes the whole of light get into the slanting end surface. If three axes are once separated from each other, it may be generally necessary to rotate the optical fiber for aligning three parts, such as a lens, a laser and a fiber. It takes much time to practice the rotation alignment. In the present invention, since a laser is firstly installed at a position deviated from the center of a package by $x_0$ in a certain direction, the rotation alignment of the optical fiber is unnecessary. The time expended on the alignment among three parts is decreased, which lowers the production cost. The laser module of the present invention is excellent in output power and production cost.

BRIEF DESCRIPTION OF THE DRAWINGS

FIG. 6(a) is a projected view of the optical system showing the relative positions of a laser, a lens and an optical fiber in XY plane by projecting the laser and the optical fiber on a lens middle plane when they are placed in their most suitable positions.

FIG. 6(b) is a projected view of the optical system showing the relative positions of a laser, a lens and an optical fiber by projecting the laser and the optical fiber on a lens middle plane when they are placed at positions ①, ②, ③ and ④ deviating from their most suitable positions.

FIG. 11 is a view of two-dimensional distribution of laser mounting positions when sixty lasers are mounted in sixty packages, respectively according to the present invention, and a slanting angle θ of an optical fiber is 6°, i.e. θ=6°. A circle shows the area having a coupling efficiency degradation smaller than −1 dB. Almost all samples are enclosed in the circle. It proves that this invention can make laser modules having the efficiency range from the most suitable coupling efficiency to a −1 dB fall without rotation alignment of the optical fiber.

FIG. 12 is a histogram of coupling power distribution (μm) when the present invention is applied to sixty semiconductor laser module samples. In this case, the average of light power is 361 μw and the standard deviation is 53 μm.

DETAILED DESCRIPTION OF THE PREFERRED EMBODIMENTS

Four embodiments of the present invention will be explained by referring to the accompanying figures of FIG. 13 to FIG. 16.

Embodiment 1: Pig-tail type laser module

Laser is deviated in parallel with a pole surface

Figure 1:
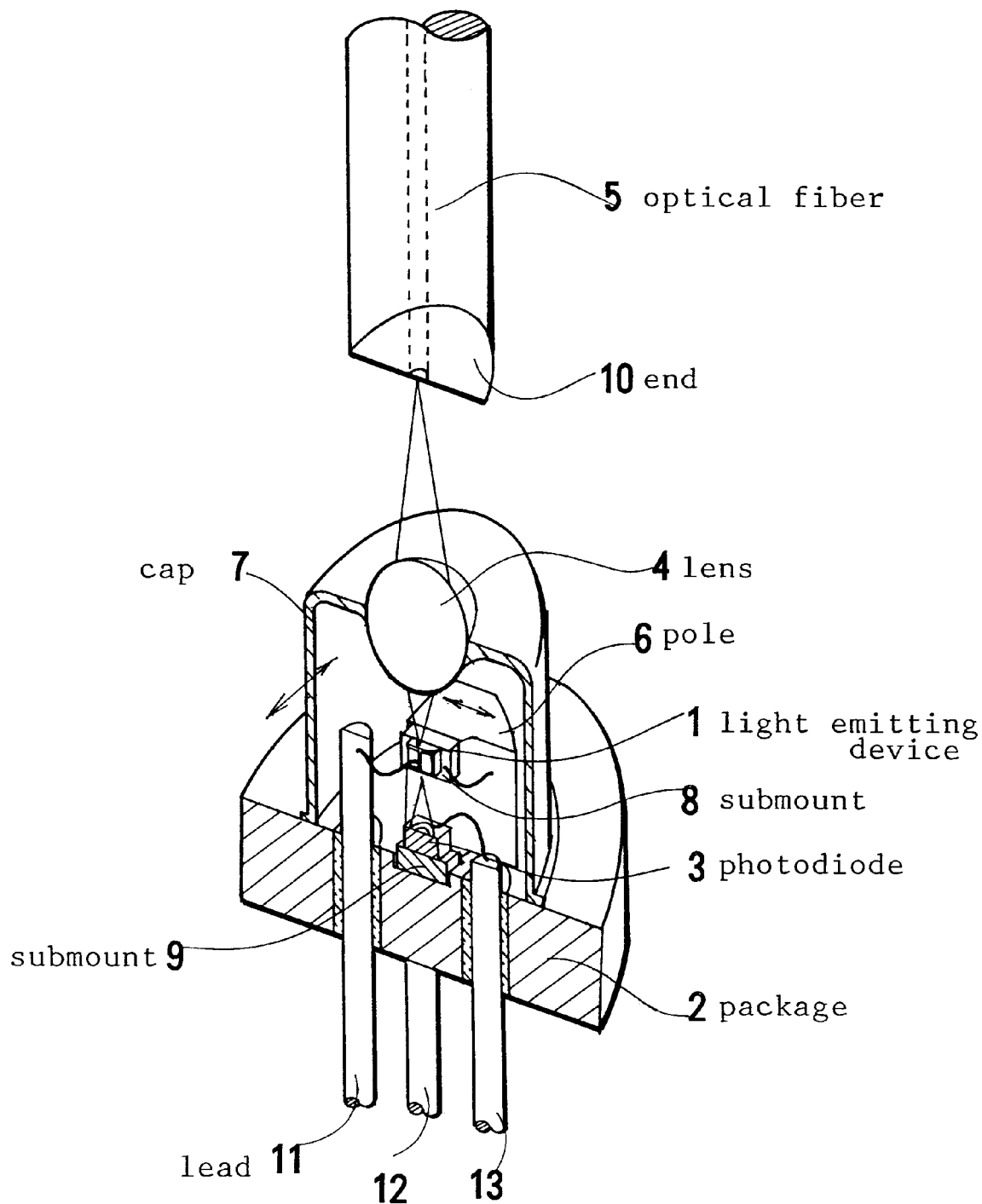
FIG. 1 is a longitudinal sectional perspective view briefly showing the relationship between a laser and an optical fiber with respect to a conventional semiconductor laser module.
Figure 2:
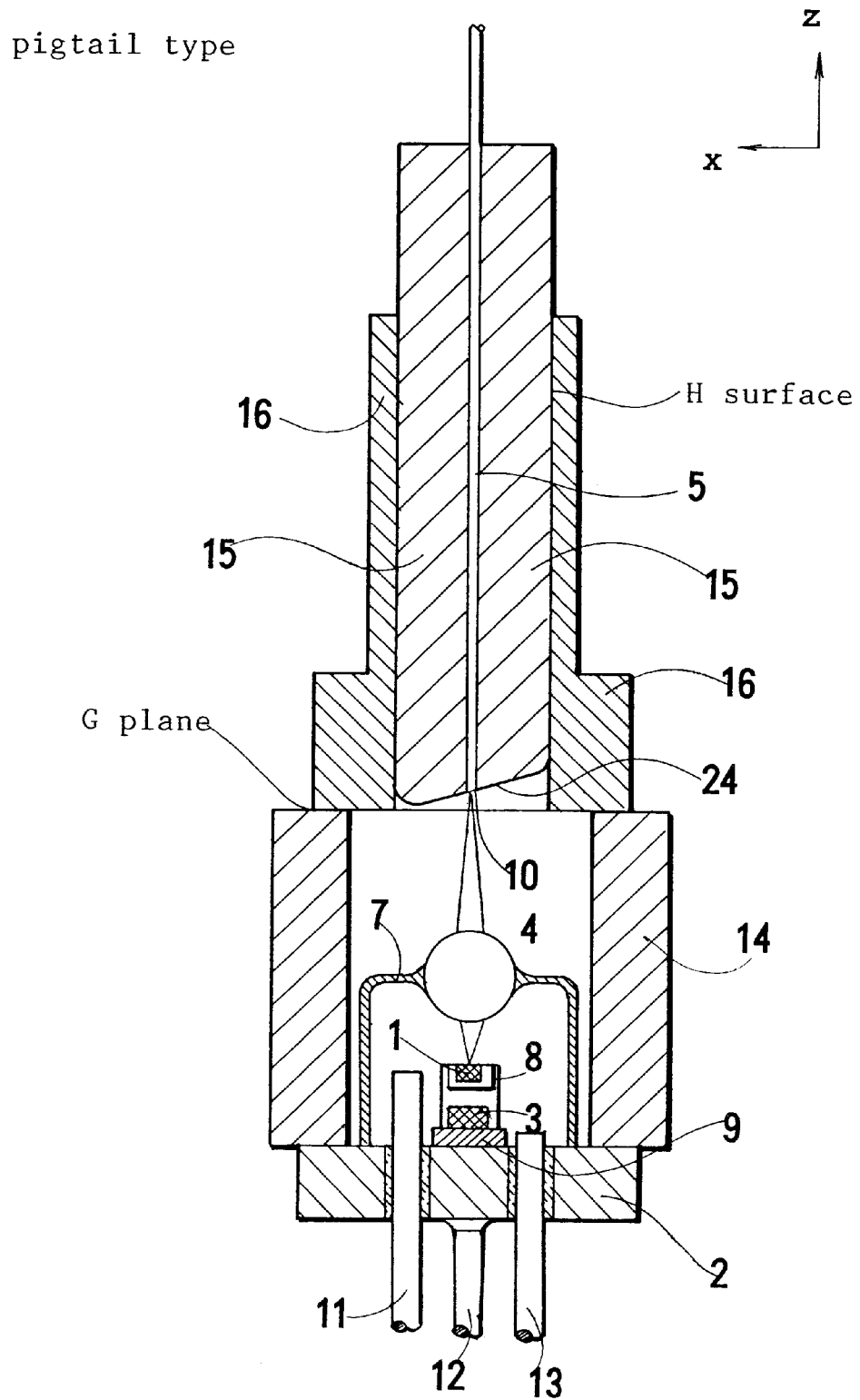
FIG. 2 is a longitudinal sectional view of a conventional pig-tail type semiconductor laser module.
Figure 3:
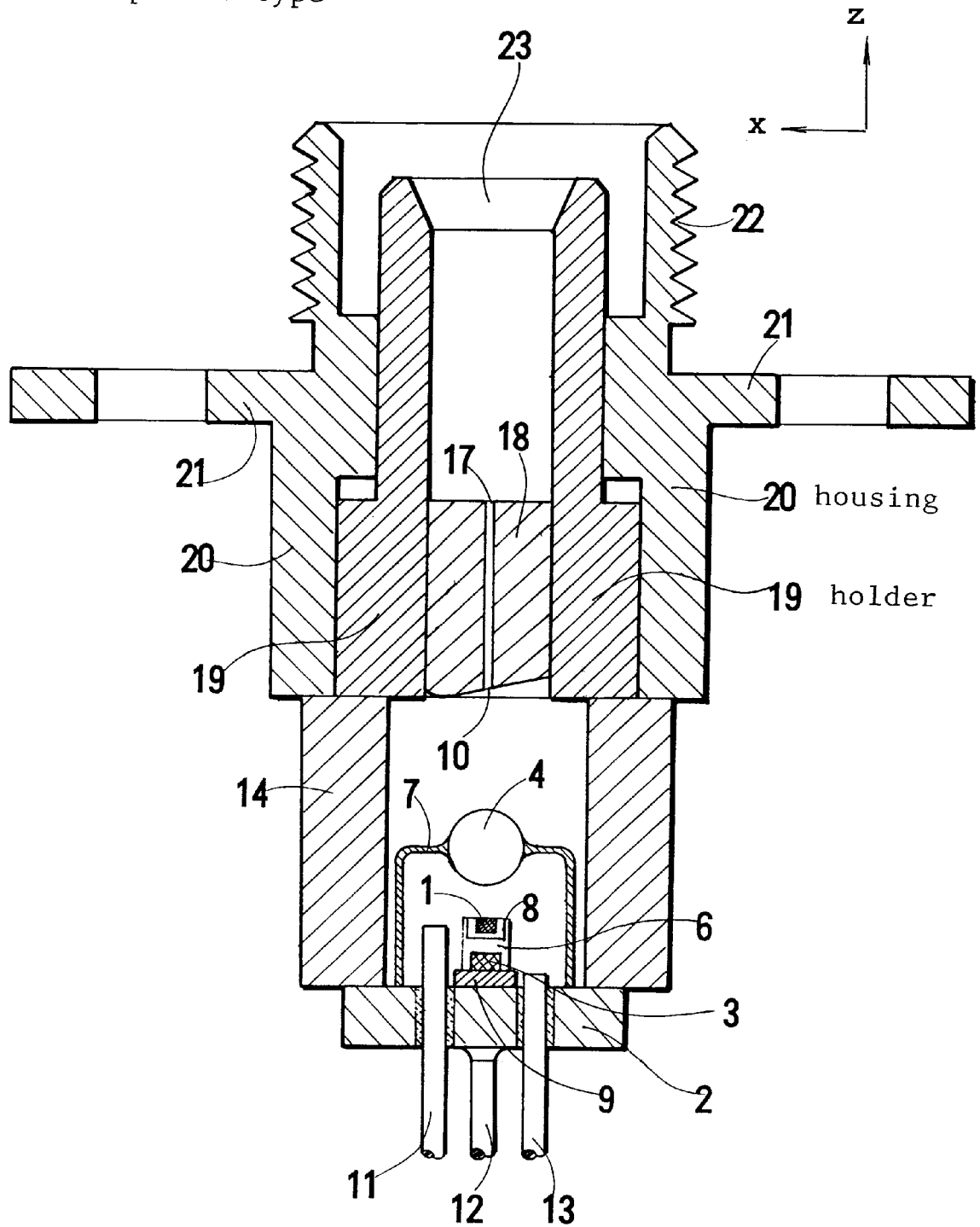
FIG. 3 is a longitudinal sectional view of a conventional receptacle type semiconductor laser module.
Figure 4:
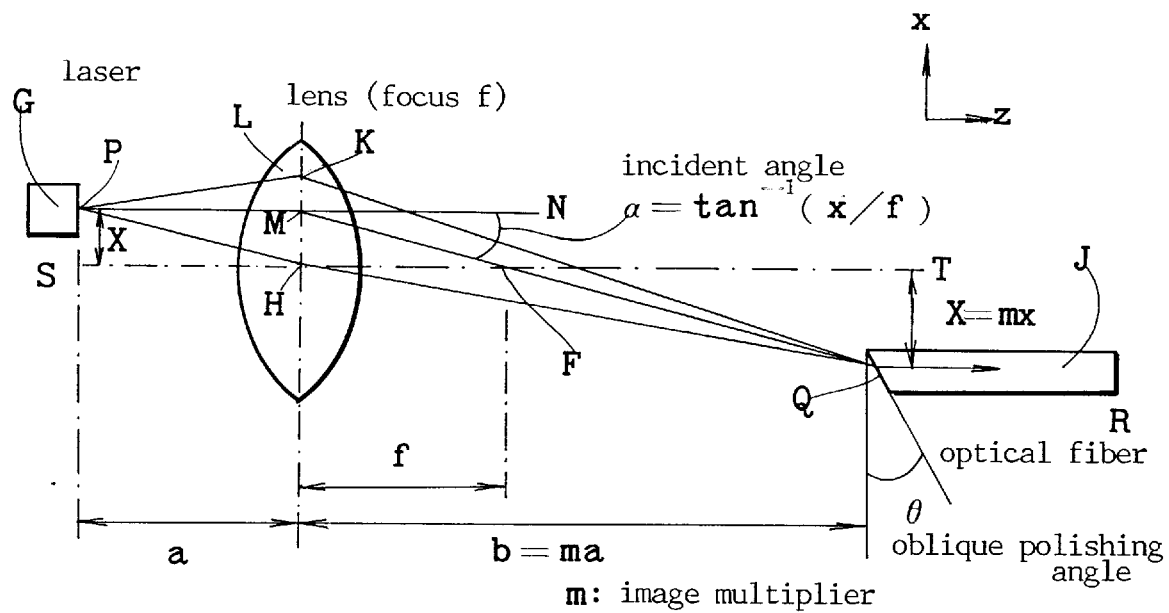
FIG. 4 is a schematic view of the optical system for explaining the most suitable relative positions of a semiconductor laser, a lens and an optical fiber with an end surface slantingly cut.
Figure 5:
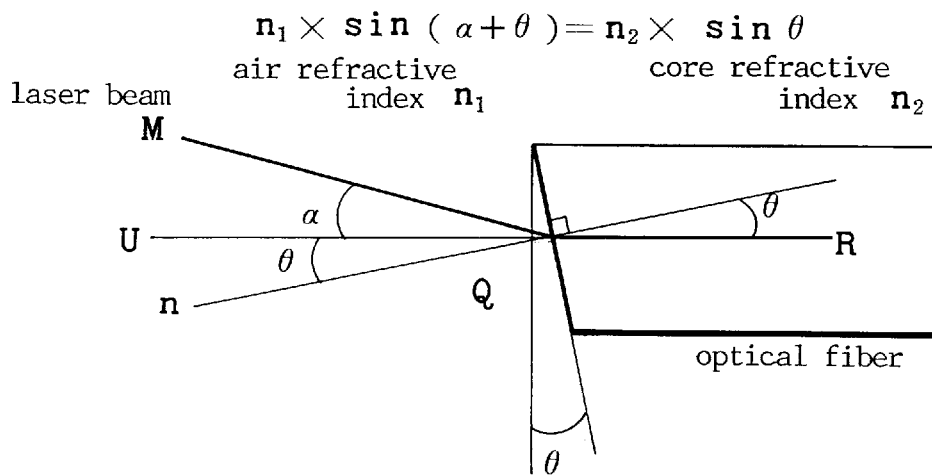
FIG. 5 is an explanatory view for explaining the coupling of a laser beam with an optical fiber having a slantingly polished end surface.
Figure 7:
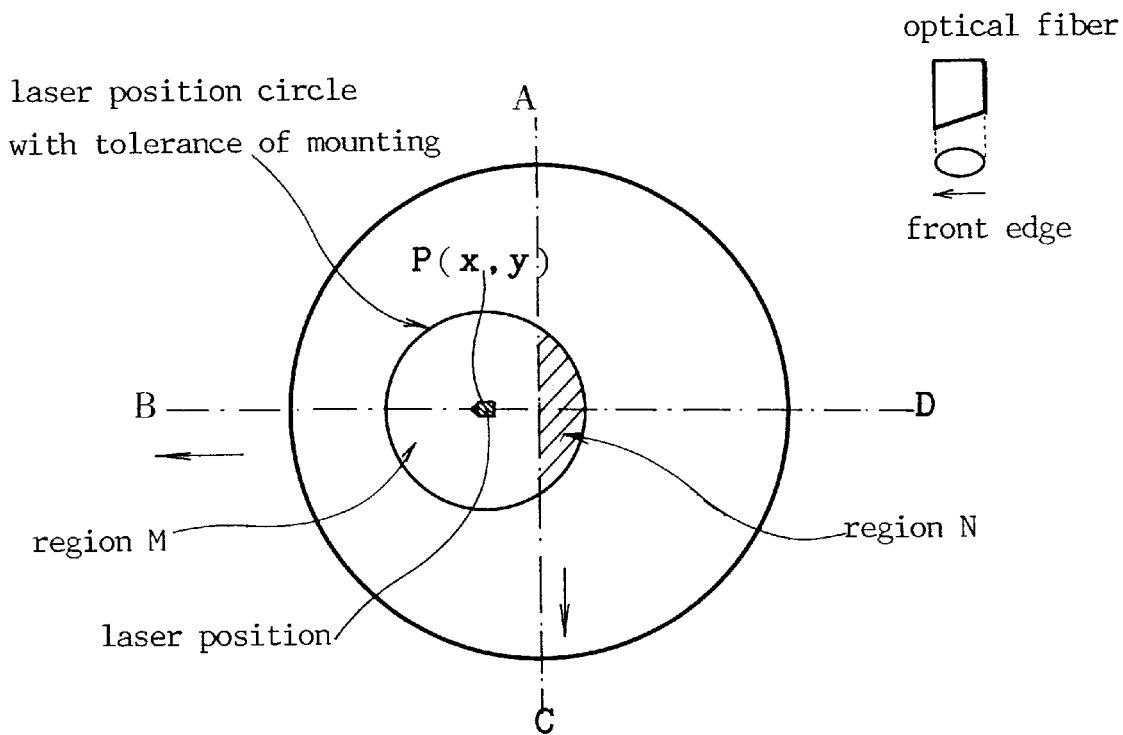
FIG. 7 is a projected view of the optical system showing the relative positions of a laser, a lens and an optical fiber where P(x, y) is the most suitable position of a laser, and a circle around P shows an allowable deviation area of a laser.
Figure 8:
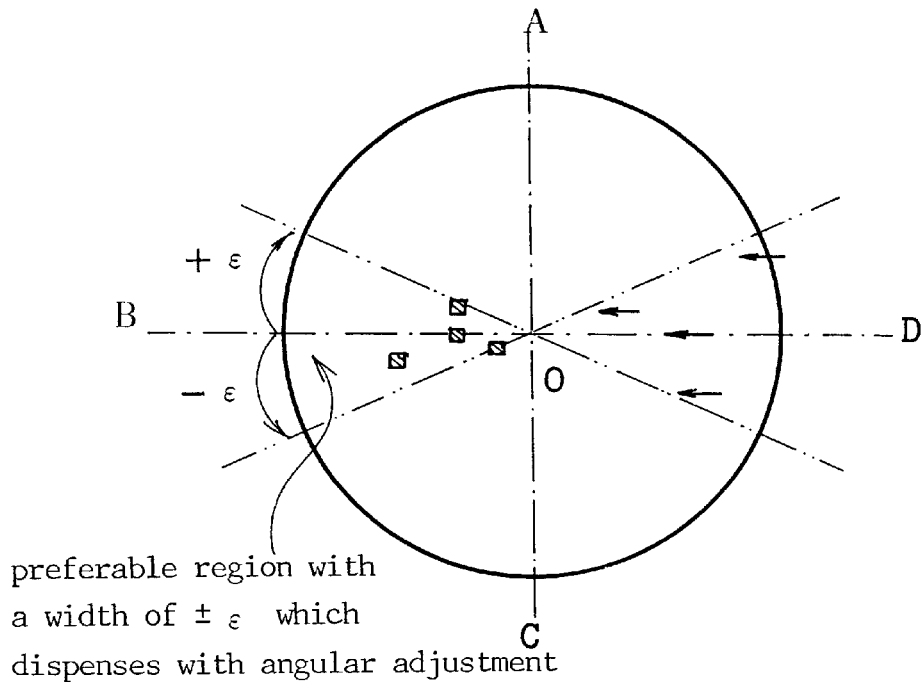
FIG. 8 is a projected view of the optical system showing the relative positions of a laser, a lens and an optical fiber by projecting the laser and the optical fiber on a lens middle plane where the area feasible for the most suitable positions of a laser without rotation alignment is shown.
Figure 9:
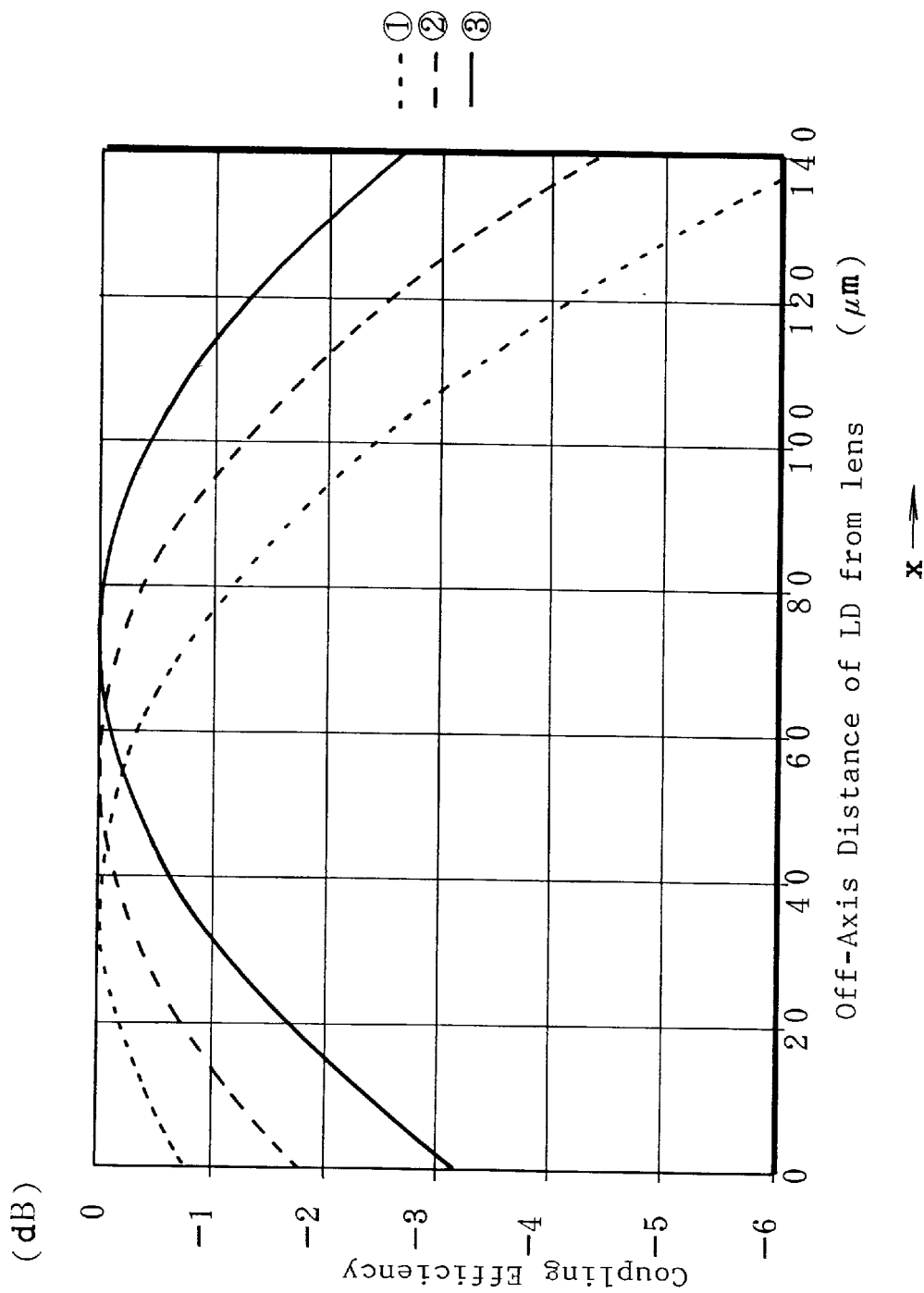
FIG. 9 is the graph showing the relationship between the distance (x) from the center line of a lens to a laser in X-direction and the coupling efficiency (dB) in three cases (X), ①, ② and ③ of the slanting angles of fiber ends where ① is 4.0°, ② is 6.0° and ③ is 8.0° when the mounting position of lasers is projected on a lens plane.
Figure 10A:
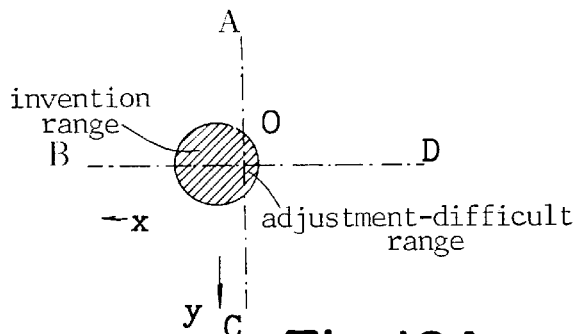
FIG. 10 shows six allowable ranges of LDs when admissible degradations of coupling efficiency are −1 dB and −0.5 dB, and slanting angles θ of an optical fiber end surface are 4°, 6° and 8°. ① is θ=4° and allowable decrease of coupling efficiency is −1 dB, ② is θ=6° and allowable decrease of coupling efficiency is −1 dB, ③ is θ=8° and allowable decrease of coupling efficiency is −1 dB, ④ is θ=4° and allowable decrease of coupling efficiency is −0.5 dB, ⑤ is θ=6° and allowable decrease of coupling efficiency is −0.5 dB, and ⑥ is θ=8° and allowable decrease of coupling efficiency is −0.5 dB.
Figure 10B:
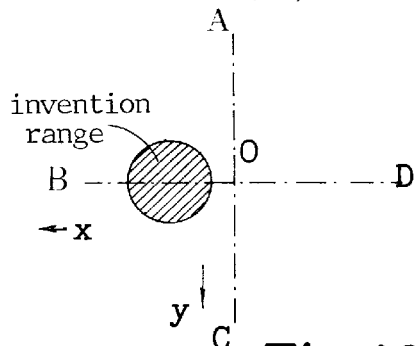
Figure 10C:
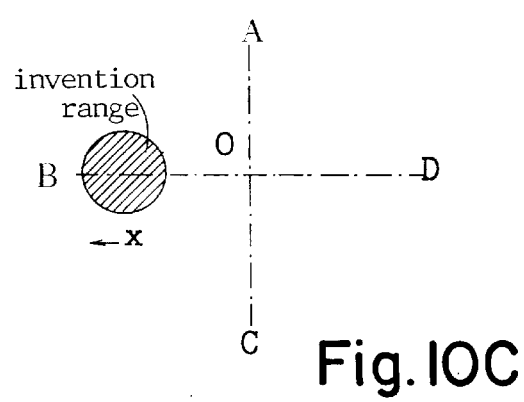
Figure 10D:
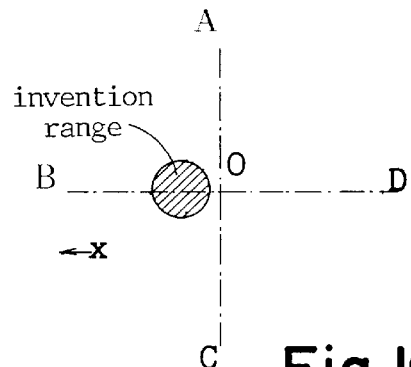
Figure 10E:
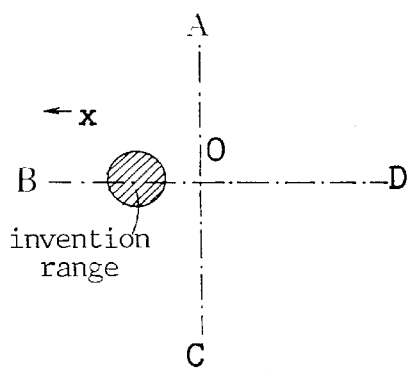
Figure 10F:
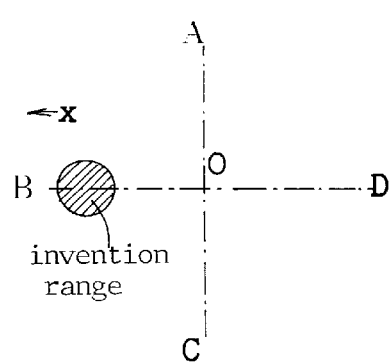
Figure 13:
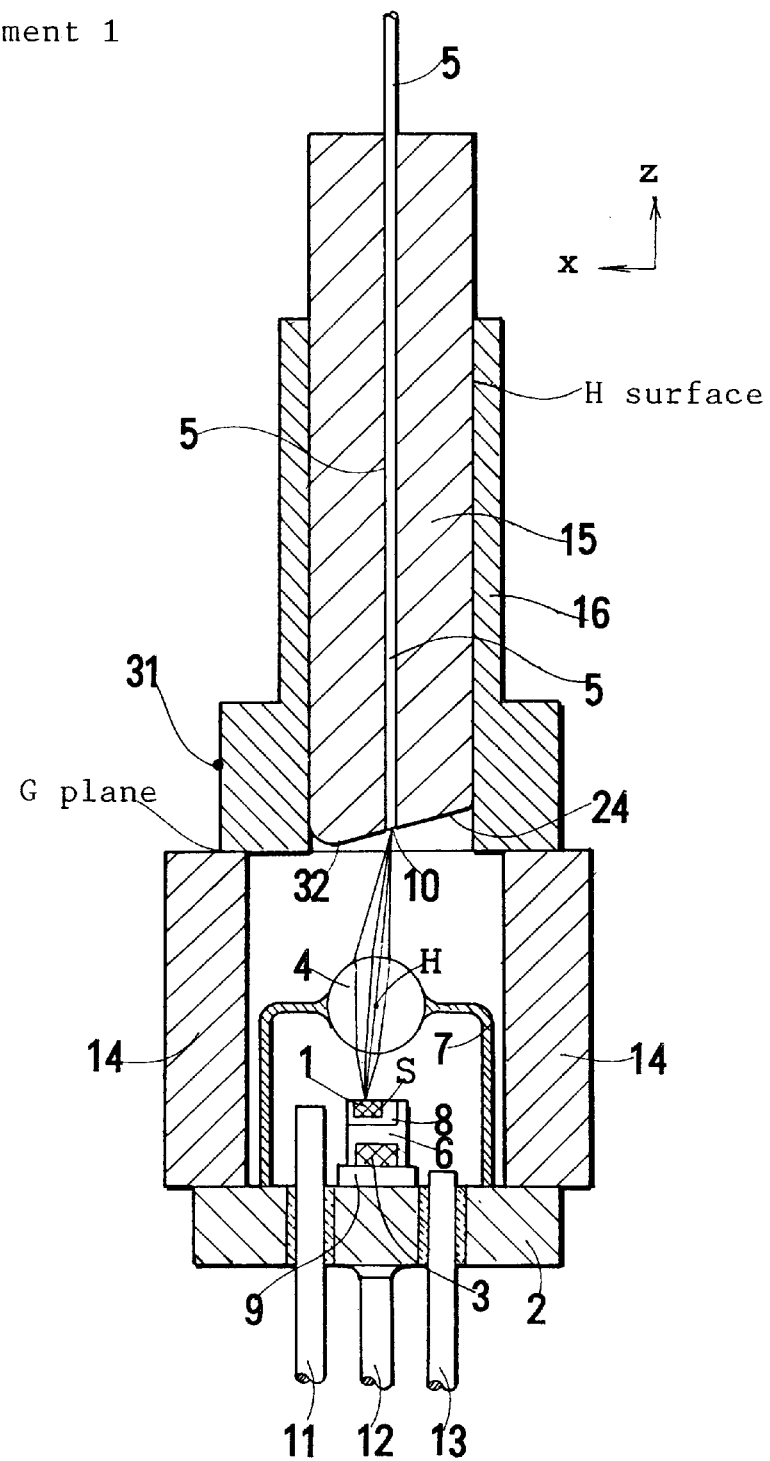
FIG. 13 shows a longitudinal sectional view of a pig-tail type laser module as a first embodiment of the present invention in which a laser is fixed to the most suitable position by deviating the laser from the center of a pole surface to the left.

FIG. 13 is a longitudinal sectional view of a semiconductor laser module as a first embodiment of the present invention. A photodiode chip 3 is fixed on a circular upper surface of a package 2 via a submount 9. The photodiode chip 3 is fixed thereon as its center coincides with the center O of the package 2.

A pole 6 stands in the direction perpendicular to the upper surface in the vicinity of the center of the upper surface of the package 2. A laser 1 is fixed on an upper eccentric spot of an inner side surface of the pole 6 via a submount 8. Namely, the laser 1 is placed at a position deviating from the center line S to the left. The side surface of the pole 6 is in parallel with XZ plane, so that the laser is installed at a position deviating from S by $x_0$ to the left on XZ plane. This is one of the characteristics of the present invention. Since the mounting error should be actually considered, the laser is fixed on a neighboring position around an aim point of ($x_0$, 0).

A cap 7 has a window, and a lens 4 fills the window. The cap 7 is fixed to the package 2 as the center O of the package 2 coincides with the center S of the lens. Here, the present invention does not adopt such a conventional alignment for stationing a cap at a position where the maximum power of light goes out in Z-direction by observing the output light power emitted from the fiber. The position of the cap 7 is determined and the cap 7 is fixed on the package 2 by a simple mechanical operation. A sleeve 14 is welded to the package 2. An end of an optical fiber 5 is fixed in a ferrule 15, and a ferrule end surface slantingly polished at an angle of θ. The ferrule 15 is inserted into a ferrule holder 16. The direction of the lowest (longest) point 32 of the slanting end surface is specified by a certain mark 31 on the side of the ferrule holder 16. The mark 31 is adjusted to the deviation direction (X-direction) of the laser chip 1, and the holder 16 is brought into contact with the sleeve 14. Hence, the lowest point 32 of a slanting surface of the ferrule is coincident with the deviation direction (X-direction) of the laser on the pole 6.

Keeping the coincident situation, the alignment among the laser 1, the lens 4 and the optical fiber 5 is carried out by moving the holder 16 parallel on XY plane. At the same time, the holder position on XY plane capable of obtaining the maximum power of input light is sought by measuring the power of light propagating at the other end of the fiber 5. The most suitable position is at a point where the holder deviates in −X direction from the center axis. Therefore, the holder 16 is fixed to the sleeve 14 at a position deviating from the center to the right. When the magnifying power of the lens is denoted by m, the optimum deviation distance of the holder 16 is expressed by $-mx_0$. In the next stage, the ferrule 15 is moved in Z-direction to the holder 16, and its most suitable position in Z-direction is determined. The last two alignments require to measure the power of light.

The mounting position of the laser sometimes requires to practice the rotation alignment of the optical fiber. The aim position for fixing a laser is $(x_0, 0)$ on X-axis, but actually, there is some error in the laser mounting, so that y coordinate is often not zero. Generally, the laser's mounted position is expressed by $(x_0 \pm \epsilon, \delta)$. In this case, the fiber can be placed at the most suitable position by rotating the optical fiber by only $\tan^{-1}(\delta/(x_0 \pm \epsilon))$ which is a small angle just near zero. Since the rotation angle is less than 30°, it is possible to obtain a sufficient power of light without rotating the fiber even in this case. Of course, it would be better for increasing the coupling efficiency to rotate the fiber by an angle of $\tan^{-1}(\delta/(x_0 \pm \epsilon))$ within ±30°. The range of the angle ±30° for rotating the optical fiber is far smaller than 180°. The rotation alignment of a narrow range of far less than 180° is good enough for the present invention.

Embodiment 2: Pig-tail type laser module

Figure 14:
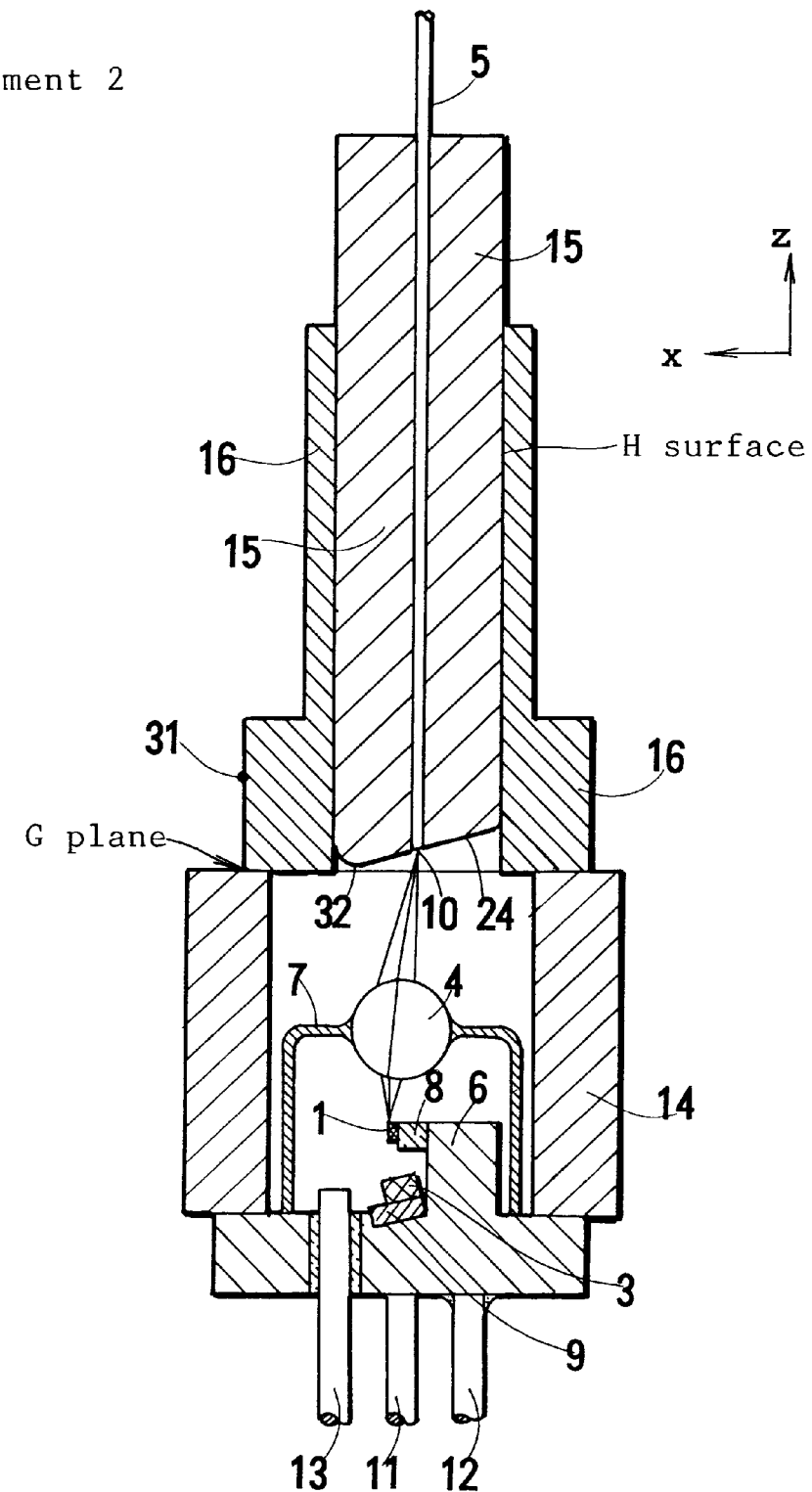
FIG. 14 shows a longitudinal sectional view of another pig-tail type laser module as a second embodiment of the present invention in which a laser is fixed to a submount being thicker than a conventional one and being fixed via the thick submount to the pole at a position by deviating the laser from the center of a package in direction perpendicular to the laser upper surface by the submount.

Laser is deviated in the direction perpendicular to a pole surface by a thick submount FIG. 14 is a longitudinal sectional view of the semiconductor laser module of a second embodiment of the present invention. A photodiode chip 3 is fixed on the center part O of a bottom surface of a circular package 2 via a submount 9. A pole 6 is protruded from the package 2 in the vicinity of the center part O. A laser 1 is fixed to a side surface of the pole 6 via a submount 8. The submount 8 is thicker than conventional ones for fixing the laser at a position deviating from the center line S to the left in the direction of thickness.

The side surface of the pole 6 is defined to be in parallel with YZ plane, so that the laser is possible to be placed at a position deviating from the center by $x_0$ to the left by sandwiching the thick submount 8 between the pole 6 and the laser 1. Since the deviation distance depends on the thickness of a submount, it is feasible to give a more approximate deviation distance near a predetermined value of $x_0$ by determining rigorously the thickness of a submount. This is another characteristic of the present invention. The laser chip 1 is fixed on the center part of the submount 8, because there is no deviation in Y-direction. Actually, the laser chip 1 is fixed on a neighboring position around a point of $(x_0, 0)$ with an error.

The following operations after the laser chip 1 has been fixed on the package 2 are the same as that of FIG. 13. A cap 7 has a window, and a lens 4 is fixed to the window. The cap 7 is installed on the package 2 as the center S of the lens 4 coincides with the center O of the package 2. Here, the present invention does not adopt such a conventional alignment of placing a cap at a position where the maximum power of light goes out in Z-direction as observing output light emitted from the fiber. The position of the cap is determined by simple mechanical operations, and the cap is fixed thereon.

A sleeve 14 is welded to the package 2. An end of an optical fiber 5 is fixed in a ferrule 15, and a ferrule end surface is slantingly polished at an angle of θ. The ferrule is inserted into a ferrule holder 16. The direction at the lowest, longest point 32 of the slanting end surface is shown by a certain mark 31 on the side of the ferrule holder 16. The mark 31 coincides with the deviation direction of the laser chip, that is, X-direction is coincident with the normal line direction on the pole 6, and the holder 16 is brought into contact with the sleeve 14. Hence, the lowest point 32 of a slanting surface of the ferrule is coincident with the deviation direction (X-direction) of the laser on the pole.

The holder 16 is aligned by moving parallel on XY plane. Further, the ferrule 15 is moved in Z-direction to the holder 16, and the most suitable position Z is determined. The last two alignments are carried out by measuring the power of light at the other end of the fiber.

Embodiment 3: Receptacle type laser module

Laser is deviated parallel to a pole surface

Figure 15:
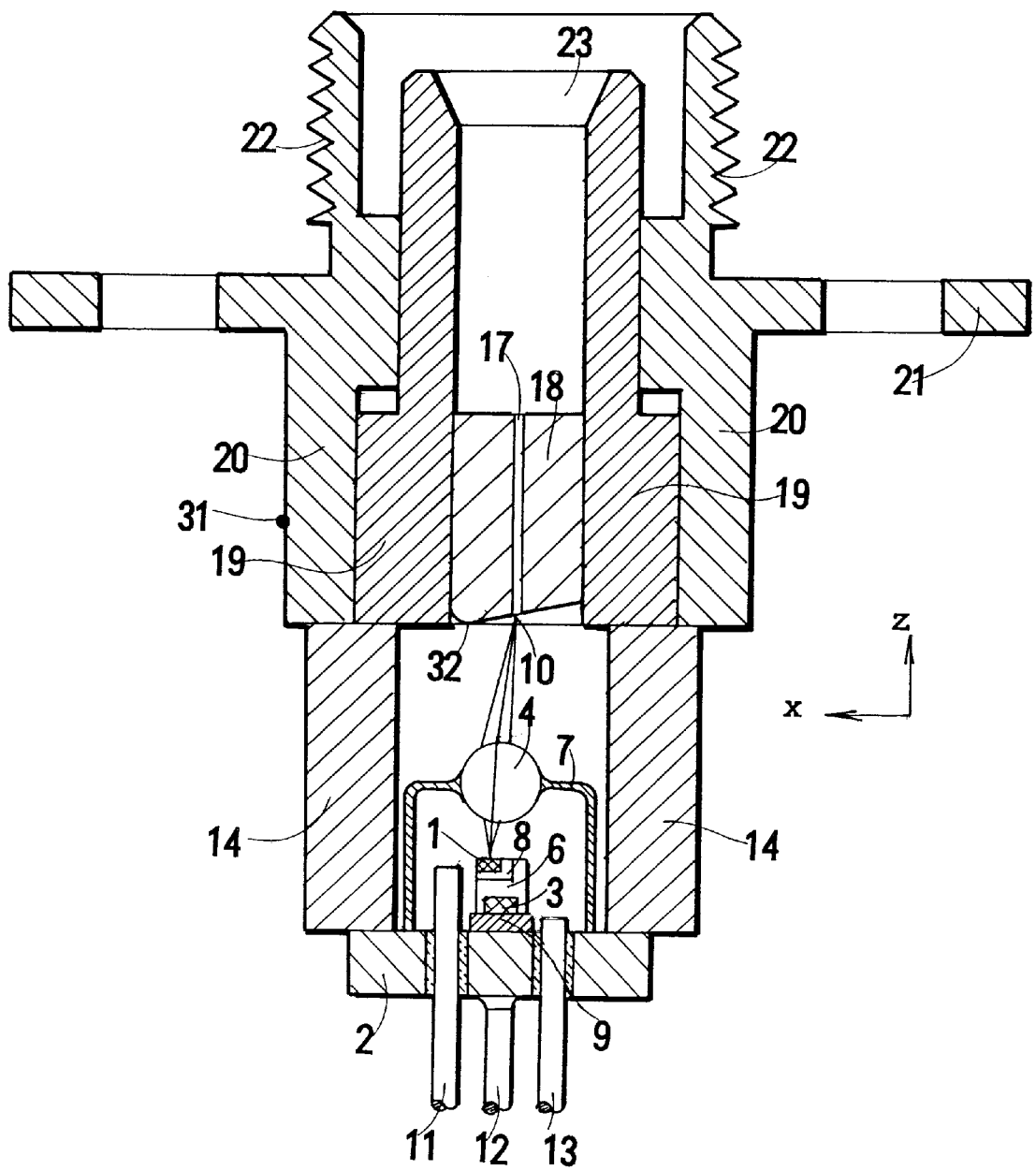
FIG. 15 shows a longitudinal sectional view of the receptacle type laser module as a third embodiment of the present invention in which a laser is fixed to a submount at the most suitable position by deviating the submount from the center of the pole to the left.

FIG. 15 is a longitudinal sectional view of the semiconductor laser module of a third embodiment of the present invention. Embodiment 3 of FIG. 15 is the same as embodiment 1 of FIG. 13 in the package•sleeve part. A photodiode chip 3 is fixed on the center part of a bottom surface of a circular package 2 via a submount 9. The photodiode chip 3 is fixed as its center is coincident with the center O of the package 2. A pole 6 protrudes upward near the center of an upper surface of the package 2.

A laser 1 is fixed to an upper side surface of the pole 6 via a submount 8. The laser deviates to the left from the center line S of the pole. The side surface of the pole 6 is in parallel with XZ plane, so that the laser 1 should be placed at a position deviating by $x_0$ from the center to the left. Since actually there are errors in the laser mounting, the laser 1 is fixed on a position neighboring to a point of $(x_0, 0)$.

A cap 7 has a window, and a lens is installed in the window. The cap 7 is fixed at the center O of the package 2. Thus the center of the cap 7 is coincident with the center S of the lens 4. Here, the present invention does not adopt such a conventional alignment for placing the cap at a position where the maximum power of light goes out in Z-direction as observing output light emitted from a laser. The position of the cap 7 a priori is determined by simple mechanical operations, and is fixed thereon. A sleeve 14 is welded to the package 2. The part put on the sleeve is a receptacle.

A short dummy optical fiber 17 is fixed on a dummy fiber ferrule 18, and a slantingly polished end surface of the ferrule 18 is inserted into a cylindrical holder 19. A cylindrical housing 20 is fixed outside of the holder 19. The housing 20 is provided with a wide flange 21. A male screw 22 is formed on a top end wall of the housing 20. The holder 19 is provided with an attachment part 23. An optical fiber can be inserted into the attachment part 23, and can be fixed thereto by an attachment screw part. Detailed structural explanation are omitted here. The optical fiber is capable of being attached to or removed from the receptacle.

The relative positions of the dummy fiber 17, the ferrule 18, the holder 19 and the housing 20 are settled beforehand. Both the dummy fiber 17 and the ferrule 18 have end surfaces slantingly polished. The direction of the lowest point 32 is denoted by a certain mark 31 on the outside wall of the housing 20. This mark 31 should coincide with the deviation direction (X-direction) of the laser chip, and the holder 19 and the housing 20 are in contact with the sleeve 14. Hence, the lowest point 32 of the ferrule slanting end surface coincides with the deviation direction (X-direction) of the laser on the pole 6.

Under these coincident conditions, the housing 20 is moved on the sleeve 14 parallel in XY plane for seeking a point at which the power attains the maximum by measuring the power of light propagating at the end of the optical fiber and is fixed to the sleeve 14 at a position where the maximum power of light is able to be obtained. A position deviating in −X-direction with a certain distance is the most suitable spot for the holder. The holder 19 and housing 20 are fixed together at a position deviating from the center to the right. When the magnifying power of the lens is m, the deviation distance suitable for the holder is $-mx_0$.

The rotation alignment of the optical fiber is sometimes necessary according to the mounting position of the laser in addition. The aim position for fixing the laser is $(x_0, 0)$ on X axis, but actually there exists an error. Therefore, y coordinate is not zero. In general, the coordinates of the laser on the package are expressed by $(x_0 \pm \epsilon, \delta)$. In this case, the fiber should be rotated only for $\tan^{-1}(\delta/x_0 \pm \epsilon)$ in order to realize the most suitable position of the fiber. $\tan^{-1}(\delta/x_0 \pm \epsilon)$ is, however, a small angle less than 30°. Since the required rotation angle is less than 30 degrees, a sufficient power of light is still able to be obtained without rotating the optical fiber. The rotation alignment raises power. The rotation alignment is easy, because the rotation angle is less than ±30°. Without the deviation $x_0$ of the laser, the rotation angles would disperse widely from −180° to 180°. A narrow angle turn is sufficient in the rotation alignment due to $x_0$.

Embodiment 4: Receptacle type laser module

Laser is deviated perpendicular to a pole surface

Figure 16:
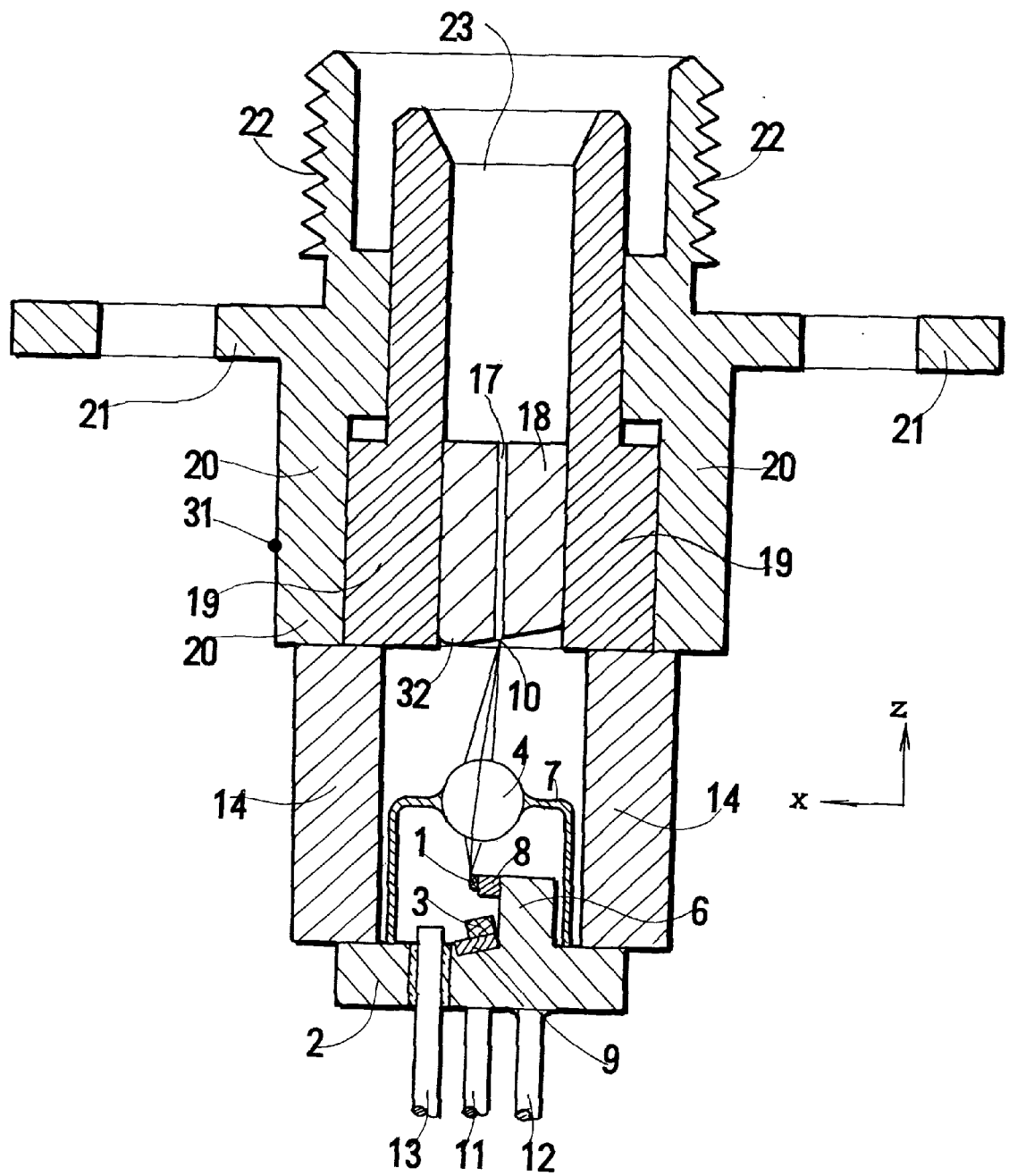
FIG. 16 is a longitudinal sectional view of the receptacle type laser module as a forth embodiment of the present invention in which a laser is fixed to a submount being thicker than a conventional one and the submount is fixed to the pole for deviating the laser from the center of a package in direction perpendicular to the laser upper surface.

FIG. 16 is a longitudinal sectional view of the semiconductor laser module of a forth embodiment of the present invention. Embodiment 4 of FIG. 16 is the same as embodiment 2 of FIG. 14 in the package•sleeve part. A photodiode chip 3 is fixed on the center part of a bottom surface of the package 2 via a submount 9. The center of the PD is coincident with the center O of the package 2. A pole 6 protrudes up in the direction perpendicular to an upper surface of the package 2 in the vicinity of the center of the package 2.

The laser 1 is fixed on a side surface of the pole 6 via a submount 8. The side surface of the pole 6 is YZ plane, and the laser 1 is fixed at a position deviating from the center line S to the left by putting it on the thick submount 8. Since the submount 8 has a thickness nearly equal to $x_0$, the laser 1 is placed at a position deviating from the center by $x_0$ to the left. Actually, there are errors, so that the laser 1 is fixed on a position neighboring to a point of $(x_0, 0)$. FIG. 16 is nearly the same as FIG. 15 in the other features.

Example of Actual Dispersion of Lasers Mounted on Package

[Examples of Actual Dispersion of Lasers Mounted on Package]

Sixty samples of the pig-tail type laser modules shown by FIG. 13 were produced. The cutting angles θ of fibers are all 6°. Laser chips were installed on packages by an apparatus aiming at an objective position P of (60 μm, 0) in the coordinates having the origin at the center of a package. After that, actual positions of lasers are measured. These procedures were practiced in every sample. FIG. 11 shows the positions (x, y) of laser chips. Namely, all the positions of sixty samples are included in a circle with a 40 μm diameter having a center (62 μm, 0) on X axis. The contribution does not include the origin (0, 0). All the laser points are on the right side of the center, that is, x>0. This fact means that rotation alignment is almost unnecessary. If there is a margin of ±2 dB in the fiber coupling power, the rotation alignment is absolutely unnecessary. Higher efficiency can be obtained by only rotating the fiber by an angle within ±40°.

FIG. 12 is a histogram showing the distribution of light coupling power in the sixty samples which have produced by fixing a cap with a lens to the package, aligning the fiber in Z-direction and aligning the fiber in XY-plane. No rotation alignment was carried out for all the samples. The number of the samples is 60. The average of power is 361 μW. The standard deviation is 53 μW. These are the results of measuring of light coupling power in the final PD modules. The measuring value includes not only the fluctuation of power caused by the misalignment but also other fluctuation such as emission power of lasers, and so on. The light power is, however, limited in a narrow range within ±1.7 dB, which is one of the evidences for showing the excellency of the alignment of the present invention. The time expended for the alignment is so much decreased that the production cost is greatly reduced.

What we claim is:

1. A method of producing a semiconductor laser module comprising the steps of:

calculating the most suitable inclination angle α to the fiber axis line for a slanting angle θ of a slantingly polished end surface of an optical fiber;

calculating an objective deviation distance of $x_0 = a \tan \alpha$ of a laser on a package where a is a distance between a lens and a laser;

aiming at an objective point distanced by $x_0$ in a certain direction from the center of the package;

fixing a laser chip at a position in the vicinity of the aim point on the package;

installing the lens in the package at a position at which the center of the lens is coincident with the center of the package;

maintaining the optical fiber to the package in an angular direction in which the deviation direction of the laser is coincident with direction of the lowest point of the slantingly polished end surface of the fiber;

researching a point capable of obtaining the highest coupling efficiency by moving the optical fiber parallel on XY-plane perpendicular to the optical fiber axis; and fixing the optical fiber to the package at the point where the coupling efficiency becomes maximum.

2. A method of producing a semiconductor laser module as claimed in claim 1, wherein a pole is formed on an upper surface of the package in a direction perpendicular to the upper surface of the package; the laser chip is fixed on a side surface of the pole via a submount; and the laser is fixed at a position by aiming at an aim point deviating from the center by $x_0$ to the left or the right on the side surface of the pole.

3. A method of producing a semiconductor laser module as claimed in claim 1, wherein a pole is formed on an upper surface of the package in a direction perpendicular to the upper surface of the package; the laser chip is fixed on a side surface of the pole via a submount having a large thickness nearly equal to $x_0$; and the laser is fixed at a position on the submount which deviates from the center of the package by $x_0$ in a direction perpendicular to the side surface of the pole.

4. A method of producing a semiconductor laser module as claimed in claim 1, wherein the slantingly cut angle θ of the fiber end surface is approximately in the range of from 4° to 10°.

5. A method of producing a semiconductor laser module as claimed in claim 1, wherein the lens is a ball lens.

6. A method of producing a semiconductor laser module as claimed in claim 2, wherein the lens is a ball lens.

7. A method of producing a semiconductor laser module as claimed in claim 3, wherein the lens is a ball lens.

8. A method of producing a semiconductor laser module as claimed in claim 4, wherein the lens is a ball lens.

9. A method of producing a semiconductor laser module as claimed in claim 1, wherein the magnifying power of the lens of imaging the laser chip on the optical fiber end surface is approximately 1 to 3 times.

10. A method of producing a semiconductor laser module as claimed in claim 2, wherein the magnifying power of the lens of imaging the laser chip on the optical fiber end surface is approximately 1 to 3 times.

11. A method of producing a semiconductor laser module as claimed in claim 3, wherein the magnifying power of the lens of imaging the laser chip on the optical fiber end surface is approximately 1 to 3 times.

12. A method of producing a semiconductor laser module as claimed in claim 4, wherein the magnifying power of the lens of imaging the laser chip on the optical fiber end surface is approximately 1 to 3 times.

13. A method of producing a semiconductor laser module as claimed in claim 5, wherein the magnifying power of the lens of imaging the laser chip on the optical fiber end surface is approximately 1 to 3 times.

14. A method of producing a semiconductor laser module as claimed in claim 1, wherein a rotation alignment of the optical fiber does not be done for aligning the optical fiber provided with the slantingly cut end surface at the most suitable position deviating from both the lens axis and the laser axis.

15. A method of producing a semiconductor laser module as claimed in claim 2, wherein a rotation alignment of the optical fiber does not be done for aligning the optical fiber provided with the slantingly cut end surface at the most suitable position deviating from both the lens axis and the laser axis.

16. A method of producing a semiconductor laser module as claimed in claim 3, wherein a rotation alignment of the optical fiber does not be done for aligning the optical fiber provided with the slantingly cut end surface at the most suitable position deviating from both the lens axis and the laser axis.

17. A method of producing a semiconductor laser module as claimed in claim 4, wherein a rotation alignment of the optical fiber does not be done for aligning the optical fiber provided with the slantingly cut end surface at the most suitable position deviating from both the lens axis and the laser axis.

18. A method of producing a semiconductor laser module as claimed in claim 5, wherein a rotation alignment of the optical fiber does not be done for aligning the optical fiber provided with the slantingly cut end surface at the most suitable position deviating from both the lens axis and the laser axis.

19. A method of producing a semiconductor laser module as claimed in claim 6, wherein a rotation alignment of the optical fiber does not be done for aligning the optical fiber provided with the slantingly cut end surface at the most suitable position deviating from both the lens axis and the laser axis.

20. A method of producing a semiconductor laser module as claimed in claim 1, wherein the optical fiber is aligned by rotation alignment for a rotation angle of less than 90°.

21. A method of producing a semiconductor laser module as claimed in claim 2, wherein the optical fiber is aligned by rotation alignment for a rotation angle of less than 90°.

22. A method of producing a semiconductor laser module as claimed in claim 3, wherein the optical fiber is aligned by rotation alignment for a rotation angle of less than 90°.

23. A method of producing a semiconductor laser module as claimed in claim 4, wherein the optical fiber is aligned by rotation alignment for a rotation angle of less than 90°.

24. A method of producing a semiconductor laser module as claimed in claim 5, wherein the optical fiber is aligned by rotation alignment for a rotation angle of less than 90°.

25. A method of producing a semiconductor laser module as claimed in claim 6, wherein the optical fiber is aligned by rotation alignment for a rotation angle of less than 90°.

* * * * *